US011799826B1

(12) United States Patent
Lough et al.

(10) Patent No.: US 11,799,826 B1
(45) Date of Patent: Oct. 24, 2023

(54) MANAGING THE USAGE OF INTERNET PROTOCOL (IP) ADDRESSES FOR COMPUTING RESOURCE NETWORKS

(71) Applicant: Amazon Technologies, Inc., Seattle, WA (US)

(72) Inventors: Samuel Lough, Alexandria, VA (US); John Jeffrey Schlachtenhaufen, Arlington, VA (US); Masood Karimi, Alexandria, VA (US); Eric Andrew Rubin-Smith, Fairfax, VA (US); Shovan Kumar Das, Medina, WA (US); Joshua D Leaverton, Herndon, VA (US); Jonathan Paul Kramer, Arlington, VA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 17/535,489

(22) Filed: Nov. 24, 2021

(51) Int. Cl.
*G06F 15/16* (2006.01)
*H04L 61/5069* (2022.01)
*H04L 41/0686* (2022.01)
*H04L 61/5007* (2022.01)

(52) U.S. Cl.
CPC ...... *H04L 61/5069* (2022.05); *H04L 41/0686* (2013.01); *H04L 61/5007* (2022.05)

(58) Field of Classification Search
CPC ............. H04L 61/5069; H04L 41/0686; H04L 61/5007
USPC ...................................................... 709/224
See application file for complete search history.

(56) References Cited

U.S. PATENT DOCUMENTS

| 8,756,298 | B2* | 6/2014 | Ma | H04L 67/1001 |
| | | | | 709/208 |
| 9,288,193 | B1* | 3/2016 | Gryb | G06F 21/44 |
| 10,693,715 | B1* | 6/2020 | Strauss | H04L 61/255 |
| 10,911,407 | B1* | 2/2021 | Warburton | H04L 61/2528 |
| 11,438,338 | B2* | 9/2022 | Gulbrandsen | G06F 16/2365 |
| 2013/0166707 | A1* | 6/2013 | Christenson | H04L 41/0668 |
| | | | | 709/221 |
| 2014/0052860 | A1* | 2/2014 | Duggal | H04L 61/2514 |
| | | | | 709/225 |
| 2015/0067819 | A1* | 3/2015 | Shribman | H04L 67/06 |
| | | | | 709/218 |
| 2016/0344604 | A1* | 11/2016 | Raleigh | H04L 41/0893 |
| 2016/0373405 | A1* | 12/2016 | Miller | H04L 63/0236 |
| 2018/0234459 | A1* | 8/2018 | Kung | H04L 63/0263 |

(Continued)

*Primary Examiner* — Karen C Tang
(74) *Attorney, Agent, or Firm* — Lee & Hayes, P.C.

(57) ABSTRACT

Techniques and technologies for an IP address management (IPAM) system to monitor the usage of IP addresses across regions in one or more networks of resources. The IPAM system may be used to allocate IP addresses to resources in networks and track what IP addresses are being used by resources or available for allocation. The IPAM system may periodically obtain usage information that indicates actual, current IP address usage by the resources in the networks, identify differences between the current IP address usage and an inventory maintained by the IPAM service, and reconcile the differences. Additionally, the IPAM system may further respond to network administrator queries about their resource and IP address usage. Further, the IPAM system may emit various utilization metrics to the network administrators which may be tied to alarms or alerts around non-compliant resources or IP addresses.

20 Claims, 15 Drawing Sheets

(56) References Cited

U.S. PATENT DOCUMENTS

| | | | |
|---|---|---|---|
| 2019/0197483 A1* | 6/2019 | Li | G06Q 10/1053 |
| 2022/0014512 A1* | 1/2022 | Raleigh | H04L 63/20 |
| 2022/0131882 A1* | 4/2022 | Akella | H04L 63/0876 |
| 2022/0239578 A1* | 7/2022 | Raleigh | H04L 47/20 |
| 2022/0286530 A1* | 9/2022 | Shribman | H04L 67/02 |

* cited by examiner

900 ⤵

RECEIVE, FROM AN ADMINISTRATOR ACCOUNT REGISTERED WITH A SERVICE PROVIDER NETWORK, A REQUEST FOR AN IP ADDRESS MANAGER TO MANAGE USAGE OF A PLURALITY OF IP ADDRESSES IN A NETWORK
902

↓

ASSIGN FIRST IP ADDRESSES TO A FIRST ADDRESS GROUP, THE FIRST ADDRESS GROUP BEING ASSOCIATED WITH A FIRST ALLOCATION POLICY THAT DEFINES FIRST ALLOCATION RULES FOR ALLOCATING THE FIRST IP ADDRESSES TO FIRST RESOURCES IN A FIRST GEOGRAPHIC REGION
904

↓

ASSIGN SECOND IP ADDRESSES TO A SECOND ADDRESS GROUP, THE SECOND ADDRESS GROUP BEING ASSOCIATED WITH A SECOND ALLOCATION POLICY THAT DEFINES SECOND ALLOCATION RULES FOR ALLOCATING THE SECOND IP ADDRESSES TO SECOND RESOURCES IN A SECOND GEOGRAPHIC REGION
906

↓

RECEIVE, FROM THE FIRST GEOGRAPHIC REGION, A FIRST SNAPSHOT REPRESENTING FIRST USAGE STATES OF THE FIRST IP ADDRESSES BY THE FIRST RESOURCES
908

↓

RECEIVE, FROM THE SECOND GEOGRAPHIC REGION, A SECOND SNAPSHOT REPRESENTING SECOND USAGE STATES OF THE SECOND IP ADDRESSES BY THE SECOND RESOURCES
910

MANAGING THE USAGE OF INTERNET PROTOCOL (IP) ADDRESSES FOR COMPUTING RESOURCE NETWORKS

BACKGROUND

Computer networks are sets of interconnected computing devices that communicate with each other using communication protocols over digital connections. Various communication protocols exist that enable computing devices to communicate by defining rules for how to package data, encrypt data, transmit data, receive data and so forth. To ensure that data traffic is routed and communicated through networks to the correct destination devices, the Internet Protocol (IP) provides an addressing system where computing devices are provided with unique addresses, called IP addresses. When computing devices join networks, they are provided unique IP addresses that enable them to effectively communicate traffic with other devices over the networks. Similarly, when computing devices leave the networks, they release their IP addresses which can then be re-allocated for use by future devices. To ensure that data is communicated to the correct devices, computing devices are generally provided unique, non-overlapping IP addresses to avoid problems with routing and communication of data.

Thus, every computing device, resource, and workload connected to a network depends on its IP address to communicate. The explosive growth of network-connected mobile devices and Internet-of-Things (IoT) devices, along with the rapid shift in workloads to the cloud, requires organizations and entities to plan, track, and manage IP addresses at large scales. Organizations that manage networks must keep track of information associated with potentially hundreds of thousands of IP addresses, including the inventory of used and unused IP addresses, subnetworks, routing domains, security settings, and so forth. This task can be complex and can lead to latency in allocating IP addresses to new devices, IP address conflicts, resource connectivity issues and application downtime, and other issues. Additionally, it can be difficult to identify and address the issues caused by IP address mismanagement.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

FIGS. 9A and 9B collectively illustrate a flow diagram of an example method for an IPAM system to assign IP addresses to multiple address groups for different regions, receive snapshots of IP address usage in those regions, identify a non-compliant resource, and determine a remedial action for the non-compliant resource.

DETAILED DESCRIPTION

Figure 1:
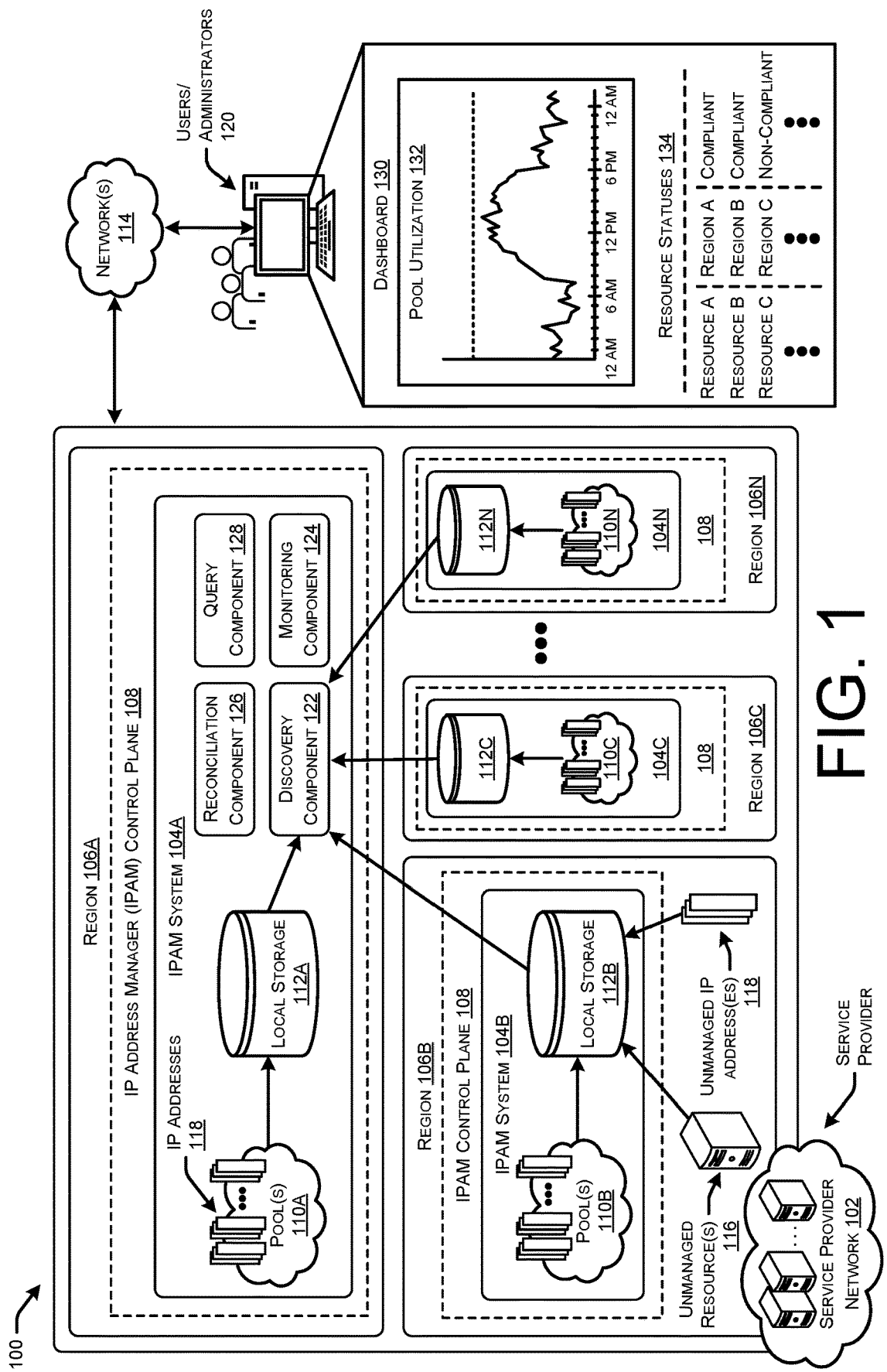
FIG. 1 illustrates a system-architecture diagram of an example environment in which an IP address management (IPAM) system monitors the usage of IP addresses across regions in one or more networks of resources.

This disclosure describes techniques implemented by an IP address management (IPAM) system for monitoring the usage of IP addresses across regions in one or more networks of resources. The IPAM system may be used to allocate IP addresses to resources in networks and track the IP addresses that are being used by resources and the IP addresses that are available for allocation. The IPAM system may periodically obtain usage information that indicates actual, current IP address usage by the resources in the networks, identify differences between the actual IP address usage and an inventory maintained by the IPAM service, and reconcile the differences. Additionally, the IPAM system may further respond to network administrator queries about their resource and IP address usage. Further, the IPAM system may emit various utilization metrics to the network administrators which may be tied to alarms or alerts around non-compliant resources or IP addresses.

In some examples, the IPAM system may be provided by, and managed by, a service provider network (e.g., cloud provider) that provides computing resources to users. For instance, users may register with the service provider network to host networks of resources in the service provider network. Network administrators for the networks may register for use of the IPAM system in order to begin automating IP address workflows in their network(s).

Network administrators can enroll for use of the IPAM system and begin to define how to allocate their inventory of IP addresses for resources in their network. The network administrators may initially create various virtualized domains that can be used to allocate groupings of IP addresses. For instance, a network administered may use the IPAM system to create IP spaces for individual networks, referred to herein as "scopes." Network administrators can define a scope for each network that defines the total IP space allocated for that network. By providing scopes, the IPAM system allows network administrators to reuse IP address spaces across networks. However, because a network cannot have overlapping IP addresses on multiple resources, the scopes allow for reuse of IP address spaces across unconnected networks.

After creating scopes, network administrators may define groupings of IP addresses that are allocated for different resource groups, different teams in an organization, and so forth. These groups of IP addresses, often referred to herein as "pools," may include collections of contiguous IP address ranges (e.g., Classless Inter Domain Routing (CIDR) blocks) that are allocated or partitioned for use by different entities. For example, the network administrator may define a pool of IP addresses that are usable by a production team in an organization, and define another pool of IP addresses that are only usable by a developer team in the organization, and so forth. By providing pools, the IPAM system allows network administrators to apply a policy on a pool-by-pool basis, thereby allowing network administrators to manage organizational teams differently, resource types differently, user accounts differently, and so forth.

The network administrators are then able to define allocation policies for the pools of IP addresses which define rules for how the IP addresses are allocated to different resources, user accounts, and so forth. For instance, an allocation policy may be used to define (i) what user accounts are allowed to request and use IP addresses from certain pools, (ii) minimum and maximum amounts of IP addresses (e.g., CIDR blocks) that can be allocated from pools, (iii) what resource types are permitted to use IP addresses from pools, and so forth. In this way, the network administrators may define and attach different allocation policies across their pools in order to treat organizational entities, resource types, etc., differently regarding IP address allocation. By automating the allocation of IP addresses according to defined policy, the IPAM system reduces the latency in providing IP addresses when requested, the chances of overlapping IP addresses, and the chance of other errors occurring when allocating IP addresses from pools.

The IPAM system may then begin allocating IP addresses from pools and to resources according to the allocation policies and/or various other policies. The IPAM system may use one or more data structures (e.g., trie data structure, search tree, etc.) to track and maintain the state of unused IP addresses, IP addresses that have been allocated by the IPAM system, and/or various metadata associated with IP address usage (e.g., utilization metrics for pools, policies, alerts, threshold, remedial actions, etc.). The IPAM system may update the data structures to indicate the state of the IP address usage in the network(s), or at least what the IPAM system believes the current state of IP address usage is in the networks.

However, network operators often perform various types of out-of-band (OOB) changes to the networks of which the IPAM system is unaware. For instance, network operators can use mechanisms that are out of the IPAM control plane to perform operations such as adding resources and providing them with IP addresses, deleting resources that were provided IP addresses by the IPAM system, allocating new IP addresses for use by resources in the network without the IPAM system being aware, and so forth. In this way, the data structures that the IPAM system maintains and uses to monitor the IP address usage in networks can become out-of-sync with the actual state of the IP address usage in the networks.

Accordingly, the IPAM system may periodically obtain "snapshots," or usage data, indicating the actual (or "ground truth"), current state of the IP address usage by resources in the network. For instance, the IPAM system may include one or more instances of an IP address manager (e.g., control-plane process) that periodically collect usage data for resources in the network(s). The IPAM instances may "wake up," or run, according to a predefined schedule and collect usage data from the resources for which they are responsible. As an example, the network(s) of a user being managed may be split into geographic regions, and at least one IPAM instance may run in each region. The IPAM instances may be provided with credentials (e.g., assume a role), or a set of permissions, that permit them to collect data from resources in the networks.

The IPAM instances may periodically run and use the set of permissions to collect various data for resources (and associated metadata) in the network(s). For instance, the IPAM instances may collect resource identifiers (IDs), resource CIDRs, resource tags indicating resources types of the resources, the region and user account in which the resource is deployed, and/or additional metadata. The IPAM instances may periodically collect this data in the different regions, generate snapshots (e.g., template) of the usage data, and push the snapshots to local storage locations in the respective regions.

Similarly, a centralized IPAM instance may periodically "wake up" or run according to a predefined schedule and obtain the snapshots from the different local storage locations. In some examples, the IPAM instances may push the snapshots to the local storage locations according to a different predefined schedule or cadence than the schedule at which the centralized IPAM instance obtains or pulls the snapshots from the local storage locations. In this way, the IPAM system may operate according to a distributed, asynchronous architecture which is useful for various reasons, such as ease in recovering from failures, isolation between regions to ensure regions to not fail together, and so forth.

After obtaining the snapshots indicating the usage data, the centralize IPAM instance may reconcile the usage data in the snapshots with the data structures that represent the state of IP address usage as tracked by the IPAM system. For instance, the IPAM system may determine that resources in the network(s) have been allocated IP addresses through a mechanism independent of the IPAM system. As another example, the IPAM system may determine that a resource has been deleted that was indicated in the data structures as using an IP address. As a further example, the IPAM system may determine that resources are using IP addresses that belong to a pool having an allocation policy that restricts the resources from using IP addresses from that pool.

The IPAM system may then perform various remedial actions to reconcile the tracked state in the data structure with the actual, current state of IP usage in the networks. For instance, the IPAM system may release allocations of IP addresses that are unused by resources, backfill allocations of IP address in the data structures that are being used by compliant resources, allocate new IP addresses to resources that are using overlapping IP addresses, and so forth. Additionally, and/or alternatively, the IPAM system may output different types of alerts to network administrators indicating statuses of the resources (e.g., compliant, non-compliant, etc.). In some examples, the alerts may indicate actions that are recommended for remedying the non-compliant resources.

In some instances, the data structures that are maintained and reconciled may be queryable to provide various types of information to network administrators. For instance, the data structure can provide information and metrics such as a number of resources that are compliant or non-compliant, utilization of IP addresses within a pool, utilization of IP addresses over different periods of time (e.g., a day, a week, a month, custom time, etc.), and/or other information. In some instances, the metrics may be tied to alarms such that the metrics are provided to network administrators when an alarm is sounded.

The techniques described herein improve the functioning of computing networks in various ways, such as by improving techniques for monitoring and managing IP address usage in networks. Using the IPAM system, IP addresses can be tracked and managed more effectively, thereby increasing the utilization of IP addresses and reducing waste. Further, the IPAM system acts as a single source of truth for IP address managers, which reduces errors during IP assignments, overlapping IP address issues, and other issues with IP address management. Additionally, the IP system collects IP-address information across all resources and accounts for a network that is used for tracking IP address utilization, troubleshooting and auditing IP address issues, and other IP address management workflows.

As described herein, a resource is determined to be compliant or non-compliant with respect to IP address usage based on various rules, metrics, policies, and so forth. For instance, a resource may be non-compliant if the resource, and/or an IP addresses allocated to the resource, violates a rule of an allocation policy. For instance, the resource may be using a block of IP addresses that is greater than a maximum allocation size permitted by an allocation policy for a pool of the IP addresses. As another example, a resource may be determined to be non-compliant if it has an overlapping IP address that is being used by another resource in the same network (or scope). As a further example, a resource may be determined to be non-compliant if an out-of-band change resulted in the resource being allocated an IP addresses that was not permitted or tracked by the IPAM system. As an even further example, an IP address and/or resource may be determined to be non-compliant if the resource has been deleted and the IP address is still indicated as being used or assigned by the resource in the tracked state of the IP system. Thus, various issues or changes may arise that result in a resource and/or IP address being determined as non-compliant or compliant.

The techniques described herein are generally described with respect to a service provider network, such as a cloud provider network. However, the techniques are generally applicable for any network, such as on-premise networks, hybrid networks, and so forth.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

FIG. 1 illustrates a system-architecture diagram of an example environment 100 in which an IP address management (IPAM) system monitors the usage of IP addresses across regions in one or more networks of resources.

As illustrated, a service provider network 102 may be operated and/or managed by a service provider. The service provider network 102 may provide various services to users to fulfil their computing resource needs, such as cloud-based computing resources. For example, the service provider network 102 may provide cloud-based, scalable, and network accessible compute power services, storage services, database services, and/or other services. Users may utilize user devices to subscribe for use of the computing resources and/or services provided by the service provider network 102.

The service provider network 102 may span across different geographic regions, and include or be associated with a computing-resource network that includes clusters of managed computing resources (e.g., servers) stored in data centers located across the different geographic regions. In this way, users who have subscribed for use of the network-based services supported by computing resources in the data centers need not invest in and maintain the computing infrastructure required to implement the various services that they may need. In some examples, users of the service provider network 102 may access or utilize computing resources of the computing devices in the data centers located in different geographic regions 106A, 106B, 106C, and 106N (where "N" is any integer) such that users located in these different geographic regions are provided with access these resources and services.

Generally, the computing resources may provide various types of computing resources, such as compute (CPU) resources (e.g., central processing units (CPUs) for processing data), memory resources (e.g., physical devices capable of storing information such as RAM or ROM), storage resources (e.g., disk storage or drive storage used to store data by various electronic, magnetic, optical, or mechanical changes to a surface layer of one or more rotating disks), graphics compute (GPU) resources (e.g., graphics processing units (GPUs)), and/or network throughput resources (e.g., average or measured rate of bit transmission per second over networks). The computing resources may be various types of computing devices, such as devices that have different chip set generations, are from different vendors, have different hardware architectures, and so forth.

Thus, the computing resources can include, for example, any hardware computing device resources, such as processor computing power/capacity, read-only and/or random-access memory, data storage and retrieval systems, device interfaces such as network or peripheral device connections and ports, and the like. In some embodiments, these resources may be dispersed among multiple discrete hardware computing devices (e.g., servers), and these hardware computing devices may implement or communicate with a virtualization layer and corresponding virtualization systems (e.g., a hypervisor on a server), whereby the compute resources are represented by, and made accessible as, virtual computing resources, such as instances of virtual machine or "VM instances." A virtual computing resource may be a logical construct, such as a data volume, data structure, file system, and the like, which corresponds to certain compute resources. Non-limiting examples of virtual computing resources include virtual machines and containers (as described below), logical data storage volumes capable of storing files and other data, software programs, data processing services, and the like.

In some examples, the service provider network 102 may offer or support an IPAM system 104 that may be used to track and manage IP addresses in networks of the users. Network administrators 120 (sometimes referred to herein as "users") can enroll for use of the IPAM system 104 and begin to define how to allocate their inventory of IP addresses 118 for resources in their network. Generally, the IPAM system 104 may perform various operations for managing networks in the IPAM control plane 108. The network administrators 120 may initially create various virtualized domains that can be used to allocate groupings of IP addresses 118. For instance, a network administrator 120 may use IPAM system 104 to create IP spaces for individual networks, or "scopes." Generally, a scope is an IP space for a single network and enables the reuse of IP addresses 118 across multiple unconnected networks. The network administrators 120 can define scopes (and/or IPAM system 104 automatically determines scopes) for each network that defines the total IP space allocated for that network. By providing scopes, the IPAM system 104 allows network administrators 120 to reuse IP address spaces across multiple networks. However, because a network cannot have overlapping IP addresses on multiple resources, the scopes allow for reuse of IP address spaces across unconnected networks.

After creating scopes, network administrators 120 may define groupings of IP addresses that are allocated for different resource groups, different teams in an organization, and so forth. These groups of IP addresses are referred to herein as pools 110A, 110B, 110C, and/or 110N. Generally, the pools 110 may include collections of contiguous IP address ranges (e.g., CIDR blocks) that are allocated or partitioned for use by different entities. For example, the network administrator 120 may define a pool 110 of IP addresses 118 that are usable by a production team in an organization, and define another pool 110 of IP addresses 118 that are only usable by a developer team in the organization, and so forth. By providing pools, the IPAM system 104 allows network administrators 120 to apply policy on a pool-by-pool basis, thereby allowing network administrators 120 to manage organizational teams differently, resource types differently, user accounts differently, and so forth.

As an example, the network administrators 120 are able to define allocation policies for the pools 110 of IP addresses 118 which define rules for how the IP addresses 118 are allocated to different resources, user accounts, and so forth. For instance, an allocation policy may be used to define (i) what user accounts are allowed to request and use IP addresses 118 from certain pools 110, (ii) minimum and maximum amounts of IP addresses 118 (e.g., CIDR blocks) that can be allocated from pools 110, (iii) what resource types are permitted to use IP addresses 118 from pools 110, and so forth. In this way, the network administrators 120 may define and attach different allocation policies across their pools 110 in order to treat organizational entities, resource types, etc., differently regarding IP address 118 allocation. However, by automating the allocation of IP addresses 118 according to a defined policy, the IPAM system 104 reduces the latency in providing IP addresses 118 when requested, the chances of overlapping IP addresses 118, and the chance of other errors occurring when allocating IP addresses 118 from pools 110.

Various types of different resources can be allocated IP addresses 118. Generally, a resource is any type of entity that can be allocated an IP address 118, including hardware devices (e.g., servers, routers, switches, VLANs, etc.), and software components, such as virtual machines, containers, subnets, applications, services, and/or any other type of computing resource. In some instances, the resources may be arranged in virtual networks, such as virtual private clouds (VPCs). The resources may be tagged with resource tags that help categorize the resources into resource types. Generally, the resources tags are metadata assigned to the resources and include a user-defined key and value. The resource tags can be used to categorize resources by purpose, owner (e.g., user account), environment, or other criteria.

Once the IP addresses 118 have been assigned to pools 110, pools 110 are assigned to regions 106, and allocation policies have been assigned to the pools 110, the IPAM system 104 may then begin allocating IP addresses 118 from pools 110 and to resources according to the allocation policies and/or various other policies. The IPAM system 104 may use one or more data structures (e.g., trie data structure, search tree, etc.) to track and maintain the state of unused IP addresses 118, IP addresses 118 that have been allocated by the IPAM system 104, and/or various metadata associated with IP address 118 usage (e.g., utilization metrics for pools, policies, alerts, threshold, remedial actions, etc.). The IPAM system 104 may update the data structures to indicate the state of the IP address 118 usage in the network(s), or at least what the IPAM system 104 believes the current state of IP address usage is in the networks.

However, the network administrators 120 often perform various types of OOB changes to the networks of which the IPAM system 104 is unaware. For instance, network administrators 120 can use mechanisms that are out of the IPAM control plane 108 to perform operations such as adding resources and providing them with IP addresses 118, deleting resources that were provided IP addresses 118 by the IPAM system 104, allocating new IP addresses 118 for use by resources in the network without the IPAM system 104 being aware, and so forth. As illustrated, region 106B may have one or more unmanaged resources 116, which are resources that have IP addresses 118, but the IP addresses 118 were not allocated by the IPAM system 104. Further, region 106B may have one or more unmanaged IP addresses 118 that were allocated to resources, but the underlying resources have been deleted or are otherwise not connected to the networks. In this way, the data structures that the IPAM system 104 maintains and uses to monitor the IP address 118 usage in networks can become out-of-sync with the actual state of the IP address 118 usage in the networks.

Accordingly, the IPAM system 104 may periodically obtain "snapshots," or usage data, indicating the actual (or "ground truth"), current state of the IP address 118 usage by resources in the network across the regions 106. The snapshots may also include a listing of actions or operations performed by users/administrators 120 for allocating or deallocating IP addresses 118 in the respective regions 106. In some examples, the IPAM system 104 may include one or more instances of an IP address manager (e.g., control-plane process) that periodically collect usage data for resources in the network(s). The IPAM instances 104 may be any type of control-plane processes (e.g., containerized processes, processes running on a VM, agents, etc.), devices, software and/or hardware components, systems, etc., that "wake up" or run according to a predefined schedule and collect usage data from the resources for which they are responsible. As an example, the network(s) of a user 120 being managed may be split into the different geographic regions 106, and at least one IPAM instance 104 may run in each region 108. The IPAM instances 104 may be provided with credentials (e.g., assume a role), or a set of permissions, that permit them to collect data from resources in the various regions 106 and/or networks. In some instances, the regions 106 may be part of the same scope or network, and in some examples, each region 106 may include one or more networks that do not overlap with the other regions 106.

The IPAM instances 104 may periodically run and use the set of permissions to collect various data for resources (and associated metadata) in the regions 106. For instance, the IPAM instances 104 may collect resource IDs, resource CIDRs, resource tags indicating resources types of the resources, the region 106 and user account in which the resource is deployed, and/or additional metadata. The IPAM instances 104 may periodically collect this data in the different regions 106, generate snapshots (e.g., template) of the usage data, and push the snapshots to local storage locations 112 in the respective regions 106. Generally, the local storage 112 may be any type of storage, such as object storage that is accessible through interfaces, such as network interfaces, web service interfaces, etc., and may be scalable to support the storage of snapshots and other information.

Similarly, a discovery component 122 of the centralized IPAM instance 104A may periodically "wake up" or run according to a predefined schedule and obtain the snapshots from the different local storage locations 112. In some examples, the IPAM instances 104 may push the snapshots to the local storage locations 112 according to a different predefined schedule or cadence than the schedule at which the discovery component 122 obtains or pulls the snapshots from the local storage locations 112. In this way, the IPAM system 104 may operate according to a distributed, asynchronous architecture which is useful for various reasons, such as ease in recovering from failures, isolation between regions 106 to ensure regions 106 to not fail together, and so forth.

After obtaining the snapshots indicating the usage data, a reconciliation component 126 of the centralize IPAM instance 104A may reconcile the usage data in the snapshots with the data structures that represent the state of IP address usage as tracked by the IPAM system 104. For instance, the reconciliation component 126 may determine that resources in the network(s) have been allocated IP addresses 118 through a mechanism independent of the IPAM system 104. As another example, the reconciliation component 126 may determine that a resource has been deleted that was indicated in the data structures as using an IP address 118. As a further example, the reconciliation component 126 may determine that resources are using IP addresses 118 that belong to a pool 110 having an allocation policy that restricts the resources from using IP addresses 118 from that pool 110.

The reconciliation component 126 may then perform various remedial actions to reconcile the tracked state in the data structure with the actual, current state of IP usage in the networks. For instance, the reconciliation component 126 may release allocations of IP addresses 118 that are unused by resources, backfill allocations of IP address in the data structures that are being used by compliant resources, allocate new IP addresses 118 to resources that are using overlapping IP addresses 118, and so forth. Additionally, and/or alternatively, the IPAM system 104 may output different types of alerts to the network administrators 120 indicating statuses of the resources (e.g., compliant, non-compliant, etc.). In some examples, the alerts may indicate actions that are recommended for remedying the non-compliant resources.

In some instances, the data structures that are maintained and reconciled may be queryable to provide various types of information to network administrators. For instance, the data structure can provide information and metrics such as a number of resources that are compliant or non-compliant, utilization of IP addresses 118 within a pool 110, utilization of IP addresses 118 over different periods of time (e.g., a day, a week, a month, custom time, etc.), and/or other information. In some instances, the metrics may be tied to alarms such that the metrics are provided to network administrators 120 by a query component 128 when an alarm is sounded.

As illustrated, the users/network administrators 120 may access a dashboard 130, such as by a user portal, that provides various types of metrics and/or alerts associated with the usage of the IP addresses 118 and resources. As shown, the dashboard 130 may present pool utilization 132 data that indicates utilization of the IP addresses 118 in a pool 110 over a course of a day with respect to the total IP addresses 118 allocated to the pool 110. Further examples of the pool utilization 132 data are presented with respect to at least FIG. 8. Further, the dashboard 130 may additionally, or alternatively, present resource statuses 134 indicating whether resources are compliant or not as compared to allocation policies, tracked state data maintained by the monitoring component 124, and/or other parameters.

The users/administrators 120 may create user accounts with the service provider to utilize the resources and services of the service provider network 102. The users 120 and administrators 120 may utilize their devices to communicate over one or more networks 114 (e.g., WANs, PANs, LANs, etc.) with the service provider network 102. The user devices may comprise any type of computing device configured to communicate over network(s) 114, such as mobile phones, tablets, laptop computers, desktop computers, televisions, servers, and/or any other type of computing device. The users 120 and administrators 120 may interact with the service provider network 102, via their user account and/or one or more user portals (e.g., web console, command line interface (CLI), application programming interface (API), etc.). The user portals may provide input data to the IPAM system 104 to perform various techniques described herein for managing networks, defining policies, reconciling differences, and so forth.

Generally, the IPAM system 104, and components thereof, may comprise software, firmware, and/or other logic that is supported one computing device, or across more computing devices in the service provider network 102. Additionally, the IPAM system 104 may comprise a system of other devices.

Figure 2:
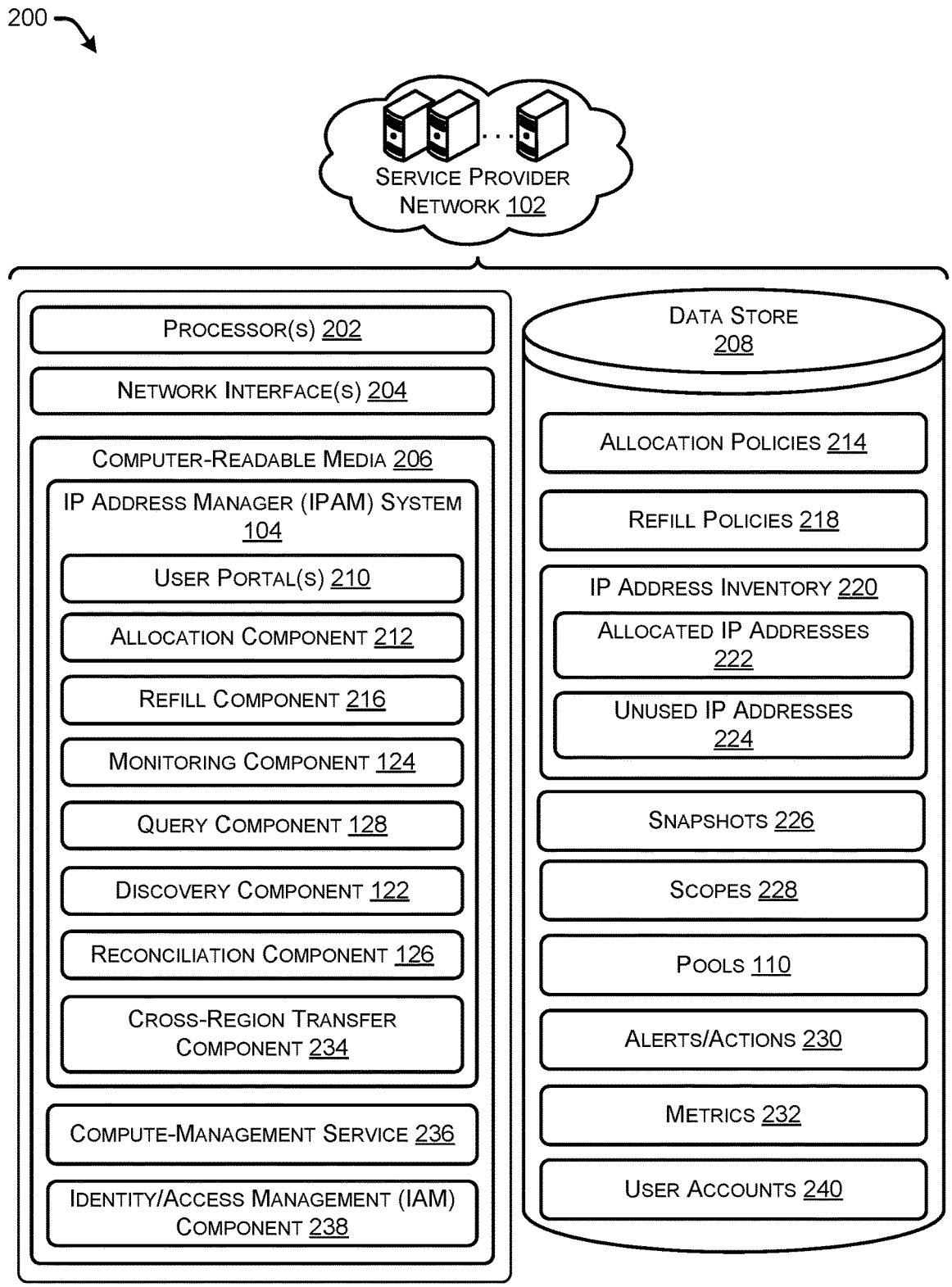
FIG. 2 illustrates a component diagram of example components of a service provider network that includes an IPAM system that monitors the usage of IP addresses in one or more networks.

FIG. 2 illustrates a component diagram 200 of example components of a service provider network 102 that includes an IPAM system 104 that monitors the usage of IP addresses 118 in one or more networks.

As illustrated, the service provider network 102 may include one or more hardware processors 202 (processors), one or more devices, configured to execute one or more stored instructions. The processor(s) 202 may comprise one or more cores. Further, the service provider network 102 may include one or more network interfaces 204 configured to provide communications between the service provider network 102 and other devices, such as the user device(s), and/or other systems or devices in the service provider network 102 and/or remote from the service provider network 102. The network interfaces 204 may include devices configured to couple to personal area networks (PANs), wired and wireless local area networks (LANs), wired and wireless wide area networks (WANs), and so forth. For example, the network interfaces 204 may include devices compatible with Ethernet, Wi-Fi, and so forth.

The service provider network 102 may also include computer-readable media 206 that stores various executable components (e.g., software-based components, firmware-based components, etc.). In addition to various components discussed in FIG. 1, the computer-readable-media 206 may further store components to implement functionality described herein. While not illustrated, the computer-readable media 206 may store one or more operating systems utilized to control the operation of the one or more devices that comprise the service provider network 102. According to one embodiment, the operating system comprises the LINUX operating system. According to another embodiment, the operating system(s) comprise the WINDOWS SERVER operating system from MICROSOFT Corporation of Redmond, Wash. According to further embodiments, the operating system(s) can comprise the UNIX operating system or one of its variants. It should be appreciated that other operating systems can also be utilized.

Additionally, the service provider network 102 may include a data store 208 which may comprise one, or multiple, repositories or other storage locations for persistently storing and managing collections of data such as databases, simple files, binary, and/or any other data. The data store 208 may include one or more storage locations that may be managed by one or more database management systems.

The computer-readable media 206 may store portions, or components, of the IPAM system 104 described herein. For instance, the computer-readable media 206 may store and/or provide user portal(s) 210 through which users 120 and administrators 120 can provide input via their user accounts and user devices. In some examples, the user portal(s) 210 include an interface through which users 120 and administrators 120 can define policies or rules for their IP address workflows. Additionally, the user portal(s) 210 may present one or more console user interface(s) (or UIs) through which the users 120 and administrators 120 may provide input data that defines or describes policies for their IP addresses 118. The user portal(s) may receive calls from APIs, CLIs, SDKs, and/or other electronic means or methods. The users/administrators 120 may observe various metrics or other information associated with IP address 118 usage via the portals 210.

The IPAM system 104 may further store or include an allocation component 212 that manages the allocation of IP addresses 118 and allows administrators 120 to define allocation policies 412. As an example, the network administrators 120 may define allocation policies 214 for the pools 110 of IP addresses 118 which define rules for how the IP addresses 118 are allocated to different resources, user accounts, and so forth. For instance, an allocation policy 214 may be used to define (i) what user accounts are allowed to request and use IP addresses 118 from certain pools 110, (ii) minimum and maximum amounts of IP addresses 118 (e.g., CIDR blocks) that can be allocated from pools 110, (iii) what resource types are permitted to use IP addresses 119 from pools 110, and so forth. In this way, the network administrators 120 may define and attach different allocation policies 214 across their pools in order to treat organizational entities, resource types, etc., differently regarding IP address allocation. However, by automating the allocation of IP addresses 118 according to defined policy, the IPAM system 104 reduces the latency in providing IP addresses when requested, the chances of overlapping IP addresses 118, and the chance of other errors occurring when allocating IP addresses 118 from pools 110.

The computer-readable media 206 may further store a refill component 216 that allows network administrators 120 to define refill policies 218 that are used to refill the pools 110 with IP addresses 118. As IP addresses 118 are withdrawn or allocated from pools 110, the inventory of available or unused IP addresses 224 may diminish. To prevent pools 110 from exhausting available IP addresses 224, the network administrators 120 may further define refill policies 218 for the pools 110 that provide rules regarding how pools 110 replenish their IP address 118 supply. For instance, network administrators 120 may define refill policies 218 that indicate minimum thresholds (e.g., 5% available, 1,000 IP addresses available, etc.) at which to replenish IP address 118 supply, parent pools 110 from which to withdraw IP addresses 118 to refill the pools 110, amounts of IP addresses 118 withdrawn when replenishing IP address 118 supply, and so forth. Similarly, network administrators 120 can define refill policies 218 for pools 110 that define who can refill from the pools 110 and how many IP addresses 118 can be taken from the pools 110. For instance, the network administrators 120 can list what child pools 110 are permitted to refill from a particular parent pool 110, minimum, maximum, and default amounts of IP addresses 118 that can be withdrawn, frequency at which IP addresses 118 can be withdrawn, and so forth.

The computer-readable media 206 may further store the monitoring component 124 which generally manages the IP address inventory 220 and tracks allocated IP addresses 222, unused IP addresses 224 for pools 110, and/or other information and metadata. The monitoring component 124 may determine the tracked state of IP address 118 usage in networks using data structure(s) that are included in or associated with the IP address inventory 220.

The computer-readable media 206 may further store a query component 128 that allows users 120 and administrators 120 to submit queries that are exposed by the IPAM system 104. The query component 128 may allow for queries such as longest-prefix match queries, historical searches, drilling down by CIDR into a scope 228, visualizing what is in a pool 110, and so forth. Additional details around the types of queries submitted are found below with respect to FIGS. 3-8.

The computer-readable media 206 may further store a discovery component 122 that is generally is in charge of finding out about all of the resources, subnets, and so on that are in a users' organization, and sending that data to the reconciliation component 126. The reconciliation component 126 may be configured to map the truth from the discovery component 122 into actions on the IPAM system's 104 data store 208. For example, during an initial onboarding, the reconciliation component 126 might backfill a bunch of allocations into various pools. As another example, when a resource is deleted, the reconciliation component 126 will release the allocation object from the IPAM system 104. As a third example, if during onboarding the discovery component 122 finds that there are two resources that have overlapping space, the reconciliation component 126 may create a notification or alert that is sent to an administrator 120 to notify them that something is wrong, and an action may need to be taken. The computer-readable media may further store a cross-region transfer component 234 that initiates cross-regional transfers of resources and/or IP addresses 118.

The computer-readable media 206 may further store code for a compute-management service 236, which may be implemented by one, or multiple, computing devices of the service provider network 102. Generally, the compute-management service 236 may be a service of the service provider network 102 that provides secure, resizable compute capacity and manages the computing resources of the computing-resource network. The compute-management service 236 may be referred to in various implementations as an elastic compute service, a virtual machines service, a computing cloud service, a compute engine, or a cloud compute service. In some examples, the compute-management service 236 may perform various functions for managing the computing-resource network, such as provisioning resources, migrating resources, providing auto-scaling for fleets of resources, configuring resources, and/or performing any other functions for managing the resources. In some instances, the compute-management service 236 may receive commands from the IPAM system 104 for managing the resources.

To utilize the services provided by the service provider network 102, administrators 120 and users 120 may register for an account with the service provider network 102. For instance, administrators 120 and users 120 may utilize a user device to interact with an identity and access management (IAM) component 238 that allows the administrators 120 and users 120 to create user accounts 240 with the service provider network 102. Generally, the IAM component 238 may enable the administrators 120 and users 120 to manage their IP address 118 allocation and computing resources securely. Using the IAM component 238, the administrators 120 and users 120 may manage their IP address 118 allocations, assignments, utilization metrics, compliance statutes, and so forth as described herein. Generally, the different user accounts 240 can assume different roles, or sets or permissions/credentials, that allow network administrators 120 and users 120 to perform different actions, and be restricted from performing some actions.

The computer-readable media 206 may be used to store and retrieve information, such as program modules, data structures, or other data. It should be appreciated by those skilled in the art that computer-readable storage media is any available media that provides for the non-transitory storage of data and that can be accessed by the service provider network 102. In some examples, the operations performed by the service provider network 102, and or any components included therein, may be supported by one or more server devices. Stated otherwise, some or all of the operations performed by the service provider network 102, and or any components included therein, may be performed by one or more computer devices operating in a cloud-based arrangement.

By way of example, and not limitation, computer-readable storage media 206 can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

Figure 3:
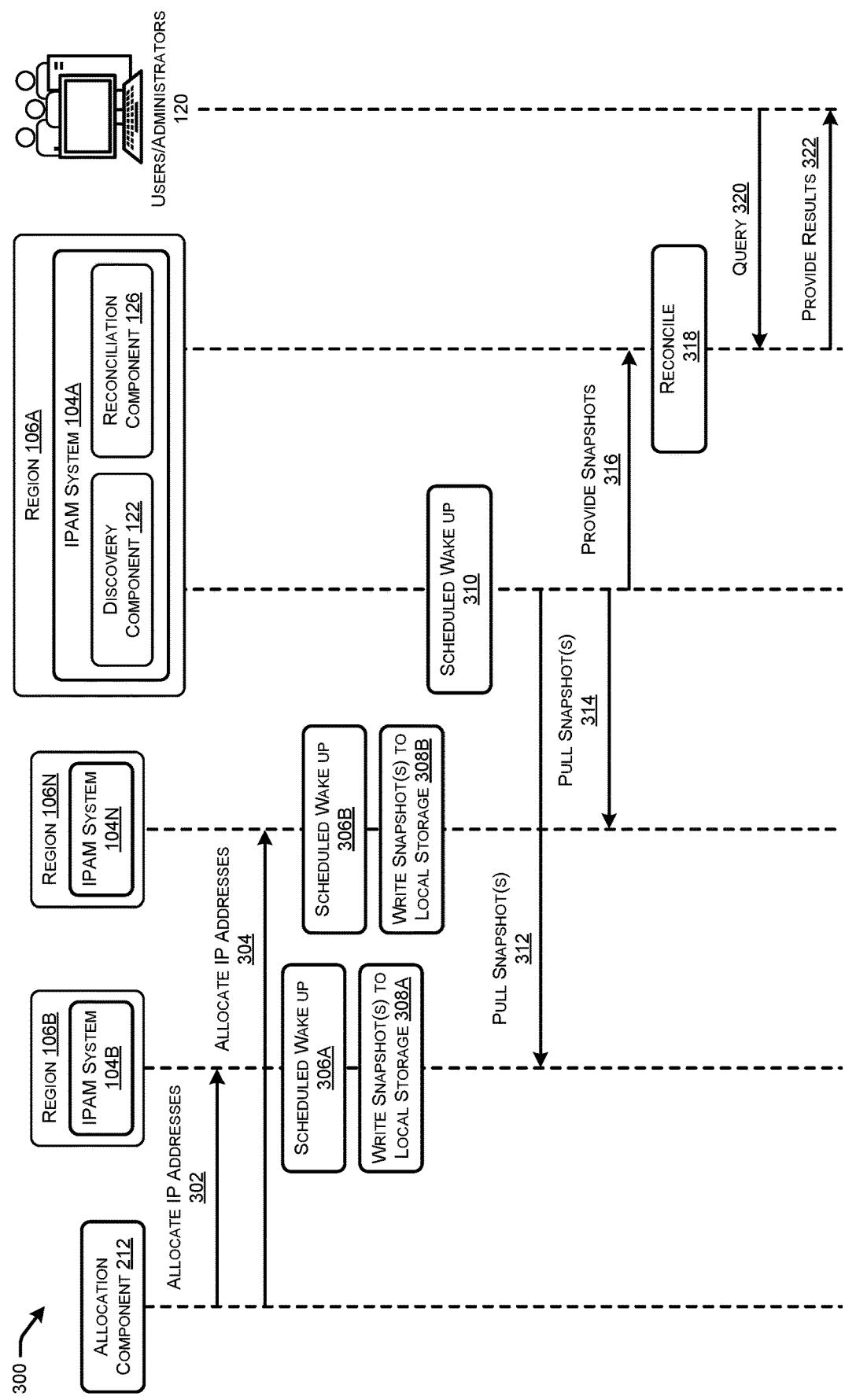
FIG. 3 illustrates a sequence diagram of an example process for an asynchronous distributed IPAM system to monitor IP address usage in one or more networks.

FIG. 3 illustrates a sequence diagram 300 of an example process for an asynchronous distributed IPAM system 104 to monitor IP address 118 usage in one or more networks.

At 302, the allocation component 212 may allocate IP addresses 118 to resources in the region 106B. Generally, the allocation component 212 may allocate the IP addresses 118 to the resources using allocation policies 214 that are associated with pools 110.

At 304, the allocation component 212 may allocate IP addresses 118 to resources in the region 106N. Generally, the allocation component 212 may allocate the IP addresses 118 to the resources using allocation policies 214 that are associated with pools 110.

At 306A and 306B, the IPAM instances 104B and 104N may wake up according to a predefined schedule or cadence. The IPAM instances 104B and 104N may wake up according to the cadence or schedule in order to, at 308A and 308B, write snapshots 226 to local storages 112B and 112N.

The snapshots 226 indicate various data for the resources, IP addresses 118, and pools 110 in the regions 106. The snapshot(s) 226 may include usage data that indicates the actual (or "ground truth"), current state of the IP address 118 usage by resources in the network. For instance, the discovery component 122 may have instances running in each region 106 that may be provided with credentials (e.g., assume a role), or a set of permissions, that permit them to collect data from resources in the networks. The snapshot(s) 226 may indicate the usage of IP addresses by resources in the networks, and may also indicate other network-context information associated with the resources (e.g., usability information). In some instances, the snapshot(s) 226 may further include information associated with different user accounts 240 that performed operations with respect to resources and/or IP addresses 118 in the different regions 106. For instance, the discovery component 112 instances may wake up and scan all of the user accounts for the regions 106 to determine what operations the user accounts 240 are performing. The operations performed by the user accounts 240 may include deleting resources, creating resources out of band, and so forth. These operations may be discovered by the local discovery component 122 instances and pushed or written to the local storage 112 in the respective regions 106. Thus, the snapshot(s) 226 may include a snapshot 226 indicating information for the resources and pools 110 of IP addresses 118, and another snapshot 226 may indicate all of the changes made in-band through IPAM 104, and potentially OOB from IPAM 104, in the different regions 106. All of this data may be included in the usage data that is used to detect compliance of resources (and/or IP addresses 118) with respect to IP address 118 usage.

At 310, a discovery component 122 may wake up according to a predefined schedule or cadence. The predefined schedule at which the discovery component 122 wakes up may be different than the schedule or cadence at which the IPAM instances 104 wake up to write snapshot(s) 226 to local storage 112.

At 312, the discovery component 112 may pull one or more snapshots 226 from local storages 112 in the region 106B according to the predefined cadence or schedule. Similarly, at 314, the discovery component 122 may pull the snapshots 226 from the local storages 112 in the region 106N according to the predefined cadence or schedule.

At 316, the discovery component 122 may provide the snapshots 226 to the reconciliation component 126. In addition to the snapshot(s) 226 representing the various usage data (e.g., resource data, IP address 118 data, changes made by user accounts, etc.), the reconciliation component 126 may also be provided with a snapshot 226 that represents the previously reconciled state of IP address 118 usage. The reconciliation component 126 may use the snapshot 226 that represents the previously reconciled state of IP address 118 usage along with the snapshots 226 representing the current state and/or changes made in order to reconcile at 318.

At 318, the reconciliation component 126 may perform various techniques for reconciling the actual state of the IP addresses 118 and resource with respect to allocation policies 214 and the tracked state (e.g., previously reconciled state) that is generated by the monitoring component 124. For instance, the reconciliation component 126 may identify issues such as resources that are allocated IP address 118 through means other than the IPAM system 104, resources that are deleted such that IP addresses 118 are unused despite being indicated as allocated by the tracked state, overlapping IP addresses 118, and so forth. The reconciliation component 126 may further update the tracked state of the usage of the IP addresses 118 to reconcile with the actual state, and may additionally perform operations and/or output alerts.

At 320, an administrator 120 may send a query 320 to the IPAM system 104A (e.g., the query component 128). The query 320 may include a request for various utilization metrics for the IP addresses 118 and/or compliance statuses for the resources in the networks. At 322, the query component 128 may search the queryable data structure to identify the information requested by the administrator 120 and provide the results to the administrator 120 via a portal or other mechanism.

Figure 4:
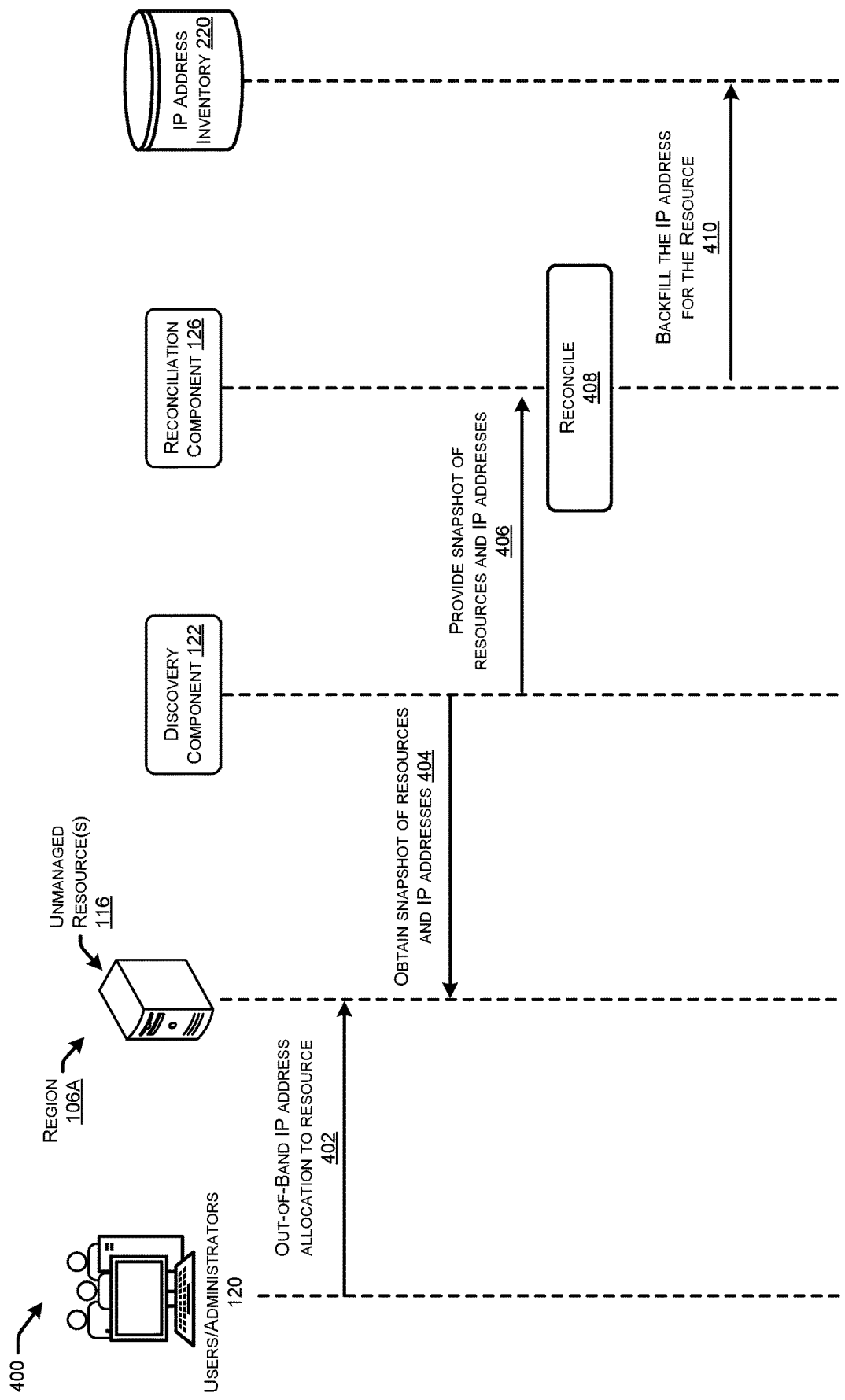
FIG. 4 illustrates a sequence diagram of an example process for a distributed IPAM system to identify an unmanaged resource that has been allocated an IP address, and backfill the allocation of the IP address in an IP address inventory.

FIG. 4 illustrates a sequence diagram 400 of an example process for a distributed IPAM system 104 to identify an unmanaged resource 116 that has been allocated an IP address 118, and backfill the allocation of IP address 118 in an IP address inventory 120.

At 402, a network administrator 120 may make an OOB IP address allocation to a resource. For instance, the administrator 120 may create a resource in region 106A and have the resource obtain an IP address 118 through a mechanism other than the IPAM system 104.

At 404, the discovery component 122 may obtain a snapshot 226 of usage data for IP addresses 118 in the region 106A, such as by the asynchronous, distributed techniques described herein using multiple instances of the IPAM 104. At 406, the discovery component 122 may provide the snapshot 226 to the reconciliation component 126, and at 408, the reconciliation component 126 may perform various techniques for reconciling the actual state of the IP addresses 118 and resource with respect to allocation policies 214 and the tracked state that is generated by the monitoring component 124. For instance, the reconciliation component 126 may identify issues such as resources that are allocated IP address 118 through means other than the IPAM system 104, resources that are deleted such that IP addresses 118 are unused despite being indicated as allocated by the tracked state, overlapping IP addresses 118, and so forth. The reconciliation component 126 may further update the tracked state of the usage of the IP addresses 118 to reconcile with the actual state, and may additionally perform operations and/or output alerts.

The reconciliation component 126 may determine that an automated (and/or with admin 120 approval) action or operation to take to remedy the non-compliant, unmanaged resource(s) 116 is to simply backfill, at 410, the IP address (es) 118 for the resource(s) 116 into the IP address inventory 220. For instance, the reconciliation component 126 may determine that the allocation of the IP address 118 to the unmanaged resource 116 is otherwise compliant with the policies for the pool 110 (e.g., IP address 118 is within a CIDR block range, compliant with allocation policies 214, etc.) and update the tracked state data in the IP address inventory 220 to indicate that the IP address 118 is allocated to the unmanaged resource 116 (now managed), and that the resource is now compliant.

Figure 5:
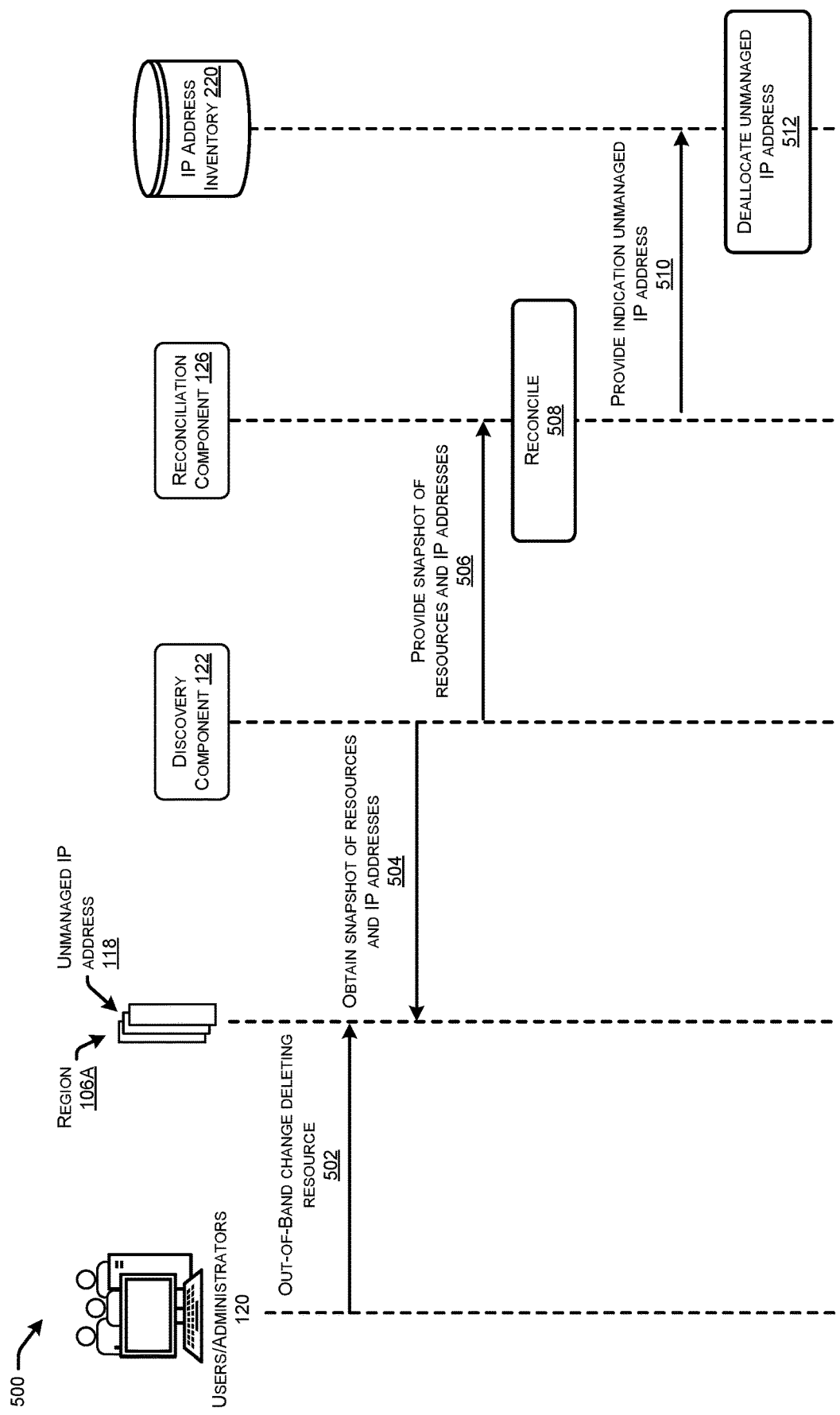
FIG. 5 illustrates a sequence diagram of an example process for a distributed IPAM system to identify an unmanaged IP address and update an IP address inventory to indicate that the unmanaged IP address is available for reallocation.

FIG. 5 illustrates a sequence diagram 500 of an example process for a distributed IPAM system to identify an unmanaged IP address 118 and update an IP address inventory 220 to indicate that the unmanaged IP address 118 is available for reallocation.

At 502, an administrator 1120 may make an OOB change that includes deleting a resource. However, the OOB change may not need to be made by an admin 120, and the resource may become deleted, disconnected, or otherwise removed from the network using other means.

At 504, the discovery component 112 may obtain snapshots 226 from the regions 106 where the snapshots indicate metadata around resources and IP addresses 118. The snapshot 226 may indicate that the unmanaged IP addresses 118 we allocated to resources, but that the resources are no longer using the unmanaged IP addresses 118.

At 506, the discovery component 122 may provide the snapshot of the resources and IP addresses 118 to the reconciliation component 126. The reconciliation component 126 may reconcile the actual state of the IP address 118 usage as compared to the tracked state and determine that the resources to which the unmanaged IP addresses 118 were allocated (or are indicated as being allocate to) are no longer using the unmanaged IP addresses 118.

The reconciliation component 126 may, at 510, provide an indication of the unmanaged IP addresses 118 to the IP address inventory 220, and the inventory 220 may be updated to indicate that the unmanaged IP addresses 118 are no longer being used. The tracked state of the IP address 118 usage may be updated such that the unmanaged IP addresses 118 are released from their allocations, and at 512, the IP address inventory 220 (or the allocation component 212) may deallocate the unmanaged IP address 118. That is, the allocation component 212 may release or otherwise update the IP address inventory 220 to indicate that the unmanaged IP address 118 is available for reallocation to a new resource. In some instances, the allocation component 212 may wait for a period of time to reallocate the IP addresses 118 that were recently released. By waiting a period of time, the allocation component 212 helps ensure that the release of the IP addresses 118 propagates through systems that were using or routing based on those IP addresses 118, and those systems can clear their systems as well to indicate that the IP addresses 118 were released.

Figure 6:
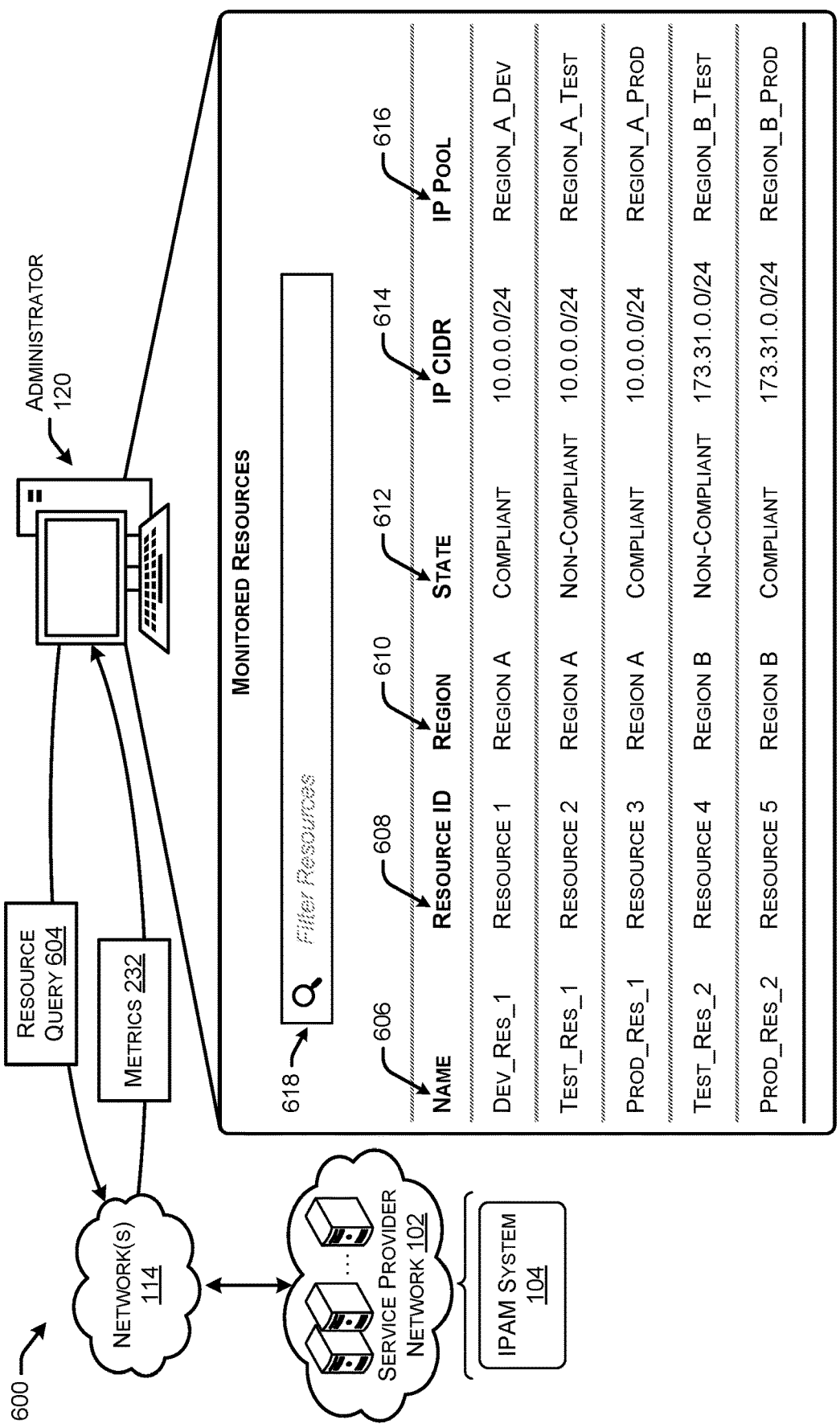
FIG. 6 illustrates a graphical user interface through which an administrator of a network can filter through resources in a network and determine whether the resources are compliant or non-compliant with respect to IP address usage.
Figure 7:
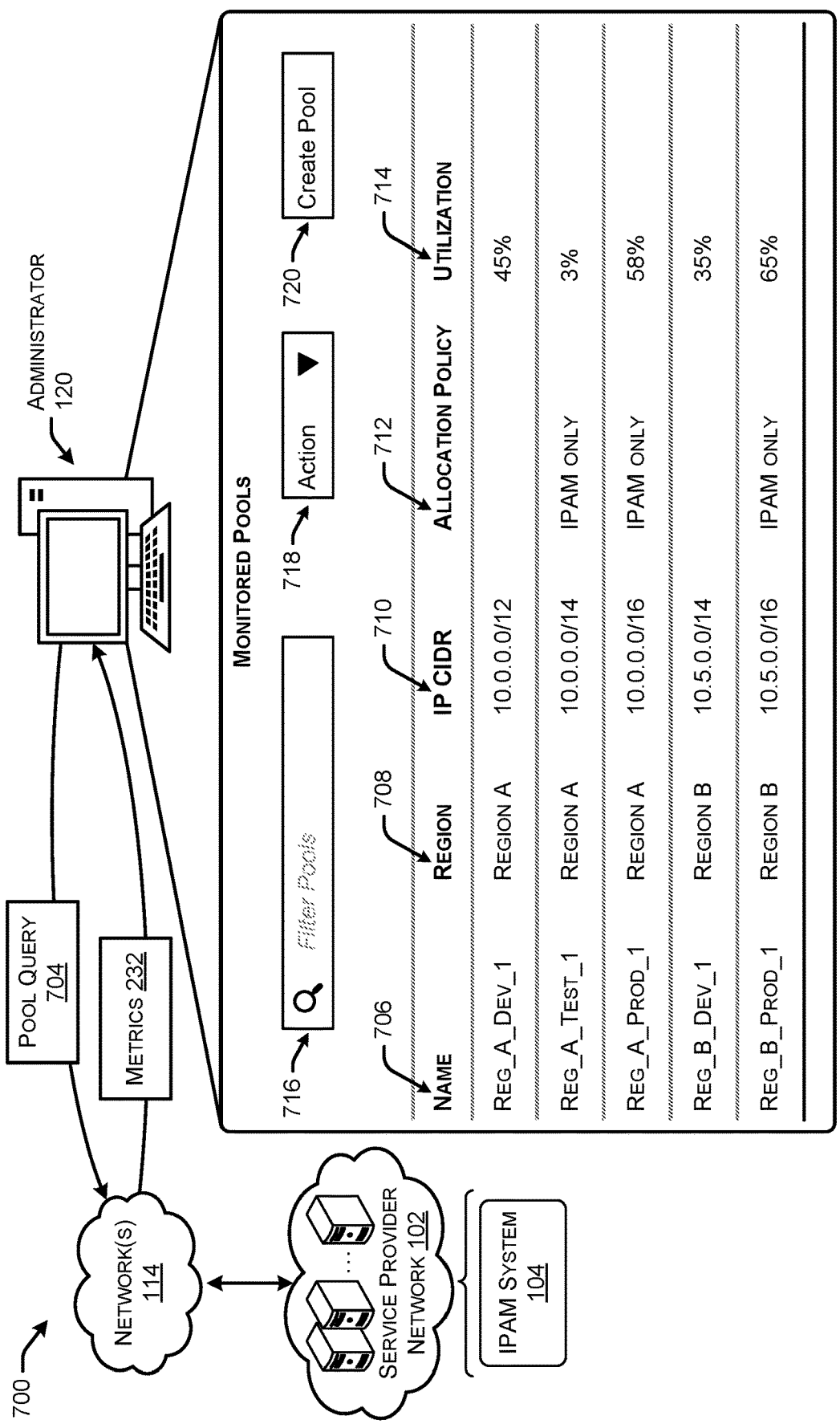
FIG. 7 illustrates a graphical user interface through which an administrator of a network can observe metrics for pools of IP addresses, such as utilization metrics.
Figure 8:
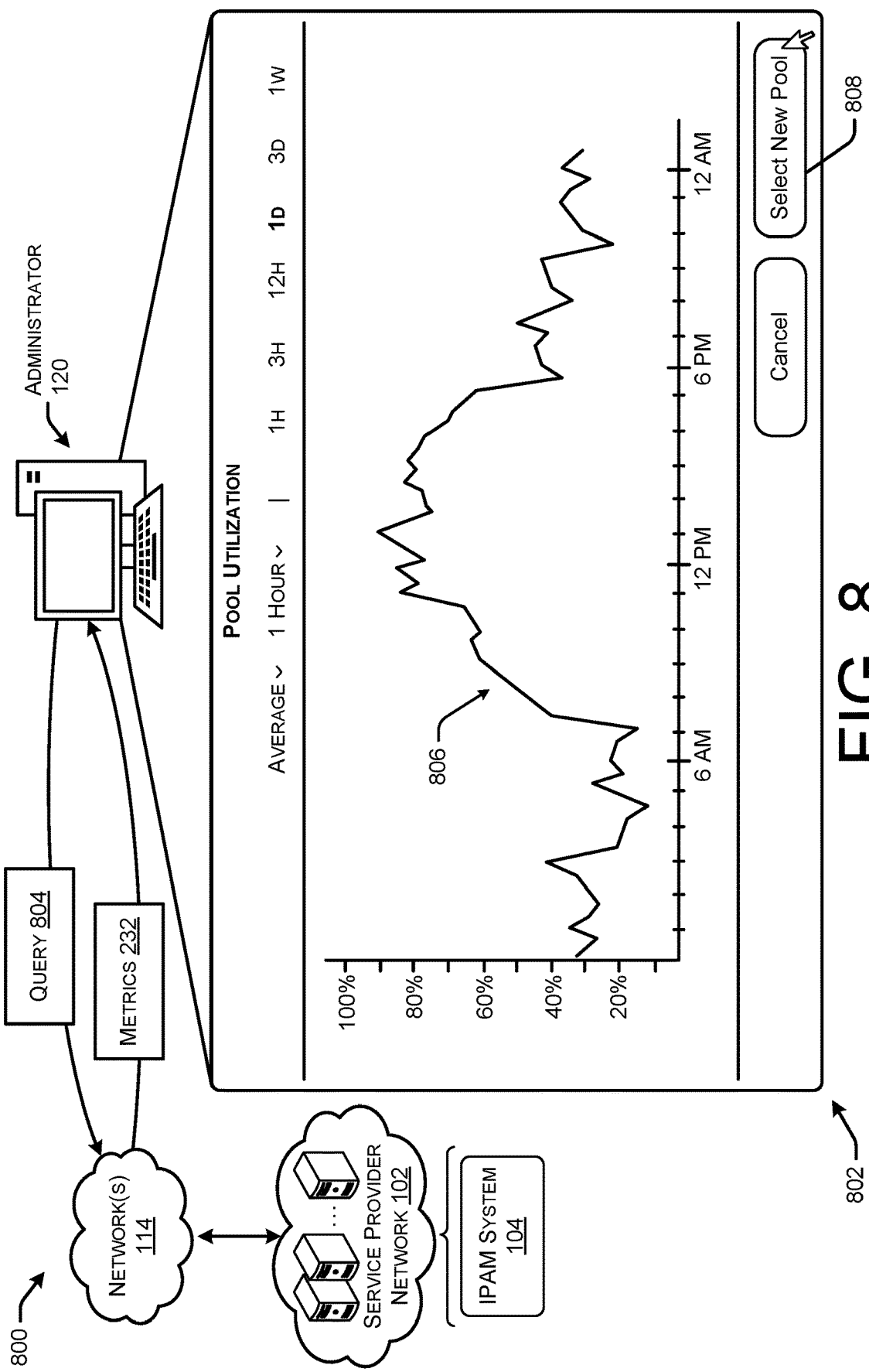
FIG. 8 illustrates a graphical user interface through which an administrator of a network can observe utilization metrics for a pool of IP addresses over different periods of time.
Figure 9B:
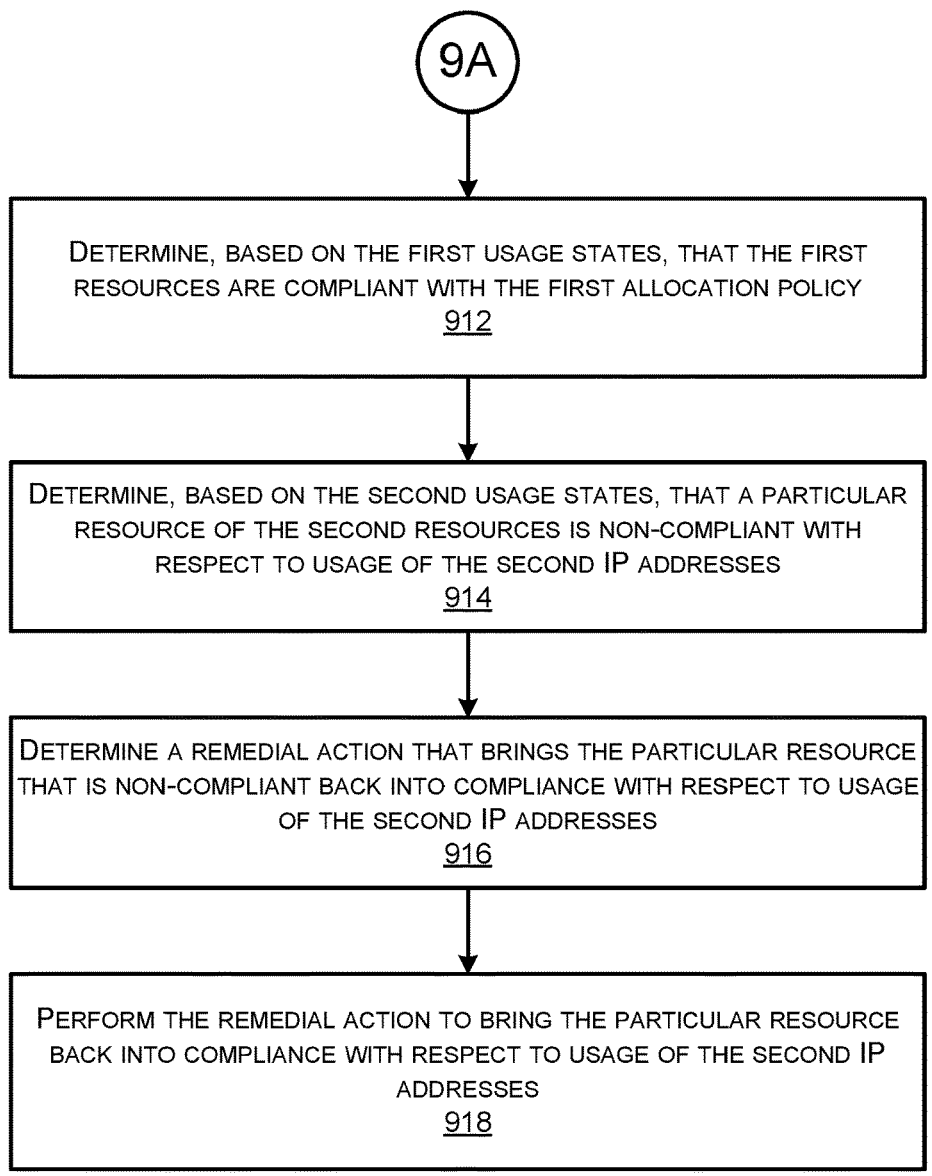

FIGS. 6, 7, and 8 illustrate various example diagrams of user interfaces that may be presented on displays of admin and/or user devices. The user interfaces may be provided to the devices via portals and/or webpages, and/or any other mechanism. The user interfaces are merely illustrative examples of layouts and information that may be presented, but it should be understood that other layouts and other information may additionally or alternatively be presented on the user interfaces as well.

FIG. 6 illustrates a diagram 600 of a graphical user interface (GUI) 602 through which an administrator 120 of a network can filter through resources in a network and determine whether the resources are compliant or non-compliant with respect to IP address usage.

An administrator 120 may submit a resource query 604 to the IPAM system 104, specifically the query component 128, that includes a request for metrics for their monitored resources. The query component 128 may then use the queryable data structure that represents the tracked state of the monitored resources and provide the requested metrics to the administrator 120.

As illustrated, the GUI 602 may present various information or metrics associated with the monitored resources, such as names 606 of the resources, the resource IDs 608 for the resources, the region 610 in which the resources are located, a state 612 of the resources (e.g., compliant, non-compliant, etc.), an IP CIDR 614 of the resources, and/or an IP pool 616 in which the resources are located. However, the GUI 602 may include a search field 618 through which the administrator 120 can submit additional queries to filer the resources and receive additional metrics 232. In this way, the administrator 120 may be apprised with information around what resources are non-compliant with respect to IP address 118 usage.

FIG. 7 illustrates a diagram 700 of a graphical user interface 702 through which an administrator 120 of a network can observe metrics for pools 110 of IP addresses 118, such as utilization metrics.

An administrator 120 may submit a pool query 704 to the IPAM system 104, specifically the query component 128, that includes a request for metrics for their monitored pools 110 of IP addresses 118. The query component 128 may then use the queryable data structure that represents the tracked state of the monitored resources and provide the requested metrics to the administrator 120.

The GUI 702 may include various information regarding the monitored pools 110, such as names 706 of the pool 110, regions 708 in which the pools 110 are located, IP CIDRs 710 that belong to or are assigned to the pools 110, allocation policies 712 that are assigned to the pools 110, and/or utilization metrics 714. As shown, the utilization metrics 714 indicate a percentage of the IP addresses 118 allocated to the pools 110 that are being used by resources. The utilization metrics 714 allow the administrator 120 to observe and understand whether pools are underutilizing the allocated IP addresses 118 or need more IP addresses 118 allocated for use.

Further, the GUI 702 may include a query field 716 through which the administrator 120 may input queries to filter the pools 110 to observe desired data or information for various pools 110. Additionally the GUI 702 has an action option 718 that allows the administrator 120 to select from various actions they can take on the pools 110, such as adding or removing allocation policies 214 and refill policies 218, adding or removing IP address 118 allocations to and from pools 110, and so forth. Further, the GUI 702 may include a create pool option 720 that allows the administrator 120 to create new pools 110 of IP addresses 118 for their networks.

FIG. 8 illustrates a diagram 800 of a graphical user interface 802 through which an administrator 120 of a network can observe utilization metrics 232 for a pool 110 of IP addresses 118 over different periods of time.

The administrator 120 may submit a query 804 to the IPAM system 104, specifically the query component 128, that includes a request for metrics regarding pool utilization for one or more pools 110 over one or more time ranges. The query component 128 may then use the queryable data structure that represents the tracked state of the monitored resources and provide the requested metrics 232 to the administrator 120.

As shown, the GUI 802 may present utilization metrics indicating usage of IP addresses 118 of a pool 110 over different selectable periods of time, such as 1 hour, 3 hours, 12 hours, 1 day, 3 days, 1 week, and so forth (including customizable periods of time in some instances). The utilization metric 806 illustrates how an allocation percentage of the total IP addresses 118 in a pool 110 changes over a period of time, such as a day in this example. The utilization metric illustrates that the percentage of IP addresses 118 used from the pool 110 increases around midday and drops off during the evenings, night, and mornings. The administrator 120 may utilize the GUI 802 to determine that the IP pool 110 needs additional IP addresses 118, has too many IP addresses 118 allocated, and/or other information for managing IP addresses 118 that are allocated to the pool 110. The administrator 120 may change the time frame over which the metrics 232 can be presented, and may additionally use a select new pool option 808 to view metrics 232 for other pools 110.

FIGS. 9A, 9B, 10, and 11 illustrate flow diagrams of example methods 900, 1000, and 1100 that illustrate aspects of the functions performed at least partly by the service provider network 102 as described in this disclosure. The logical operations described herein with respect to FIGS. 9A, 9B, 10, and 11 may be implemented (1) as a sequence of computer-implemented acts or program modules running on a computing system and/or (2) as interconnected machine logic circuits or circuit modules within the computing system.

The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, and any combination thereof. It should also be appreciated that more or fewer operations might be performed than shown in the FIGS. 9A, 9B, 10, and 11 and described herein. These operations can also be performed in parallel, or in a different order than those described herein. Some or all of these operations can also be performed by components other than those specifically identified. Although the techniques described in this disclosure is with reference to specific components, in other examples, the techniques may be implemented by less components, more components, different components, or any configuration of components.

In the illustrated example, the pool utilization metrics 232 represents the utilization of IP addresses 118 that have been explicitly assigned to resources from the pool 110 under observation. In other examples, however, the metrics 232 may be used to visualize the allocations of IP addresses 118 from the pool 110 under observation to other pools 110 (e.g., child pools 110). In this way, an administrator 120 may view FIGS. 9A and 9B collectively illustrate a flow diagram of an example method 900 for an IPAM system 104 to assign IP addresses 118 to multiple address groups for different regions, receive snapshots of IP address usage in those regions, identify a non-compliant resource, and determine a remedial action for the non-compliant resource.

At 902, the IPAM system 104 may receive, from an administrator account registered with a service provider network, a request for the IP address manager to manage usage of a plurality of IP addresses in a network. For instance, an administrator account 240 of an administrator 120 may submit a request (e.g., enroll) for IPAM 104 to manage usage of the plurality of IP addresses 118 (e.g., CIDR blocks) that are used in a network.

At 904, the IPAM system 104 may assign first IP addresses to a first address group. In some instances, the first address group is associated with a first allocation policy that defines first allocation rules for allocating the first IP addresses to first resources in a first geographic region. The first address group may be a pool 110 that is associated with a first allocation policy 214 that defines first rules for allocating the first IP addresses 118 to first resources in a first region 106.

At 906, the IPAM system 104 may assign second IP addresses to a second address group. In some instances, the second address group is associated with a second allocation policy that defines second allocation rules for allocating the second IP addresses to second resources in a second geographic region. The second address group may be a pool 110 that is associated with a second allocation policy 214 that defines second rules for allocating the second IP addresses 118 to second resources in the second region 106.

At 908, the IPAM system 104 may receive, from the first geographic region, a first snapshot representing first usage states of the first IP addresses by the first resources. For instance, an IPAM instance 104B may push a snapshot 226 to local storage 112B of the first geographic region 106B.

At 910, the IPAM system 104 may receive, from the second geographic region, a second snapshot representing second usage states of the second IP addresses by the second resources. For instance, an IPAM instance 104C may push a snapshot 226 to local storage 112C of the second geographic region 106C.

At 912, the IPAM system 104 may determine, based on the first usage states, that the first resources are compliant with the first allocation policy. As an example, the IPAM system 104 may determine that the first resources have been allocated IP addresses that are permitted by the first allocation policy 214.

At 914, the IPAM system 104 may determine, based on the second usage states, that a particular resource of the second resources is non-compliant with respect to usage of the second IP addresses. For instance, the IPAM system 104 may determine that the particular resource was provided with an IP address 118 that is indicated as unallocated in an IP address inventory 220 managed by the IP address manager 104. As another example, the IPAM system 104 may determine that particular resource was allocated an IP address and is no longer part of the network.

At 916, the IPAM system 104 may determine a remedial action that brings the particular resource that is non-compliant back into compliance with respect to usage of the second IP addresses, and at 918, the IPAM system 104 may perform the remedial action. For instance, the IPAM system 104 may update the IP address inventory 220 to indicate that the IP address 118 is allocated to the particular resource.

Figure 10:
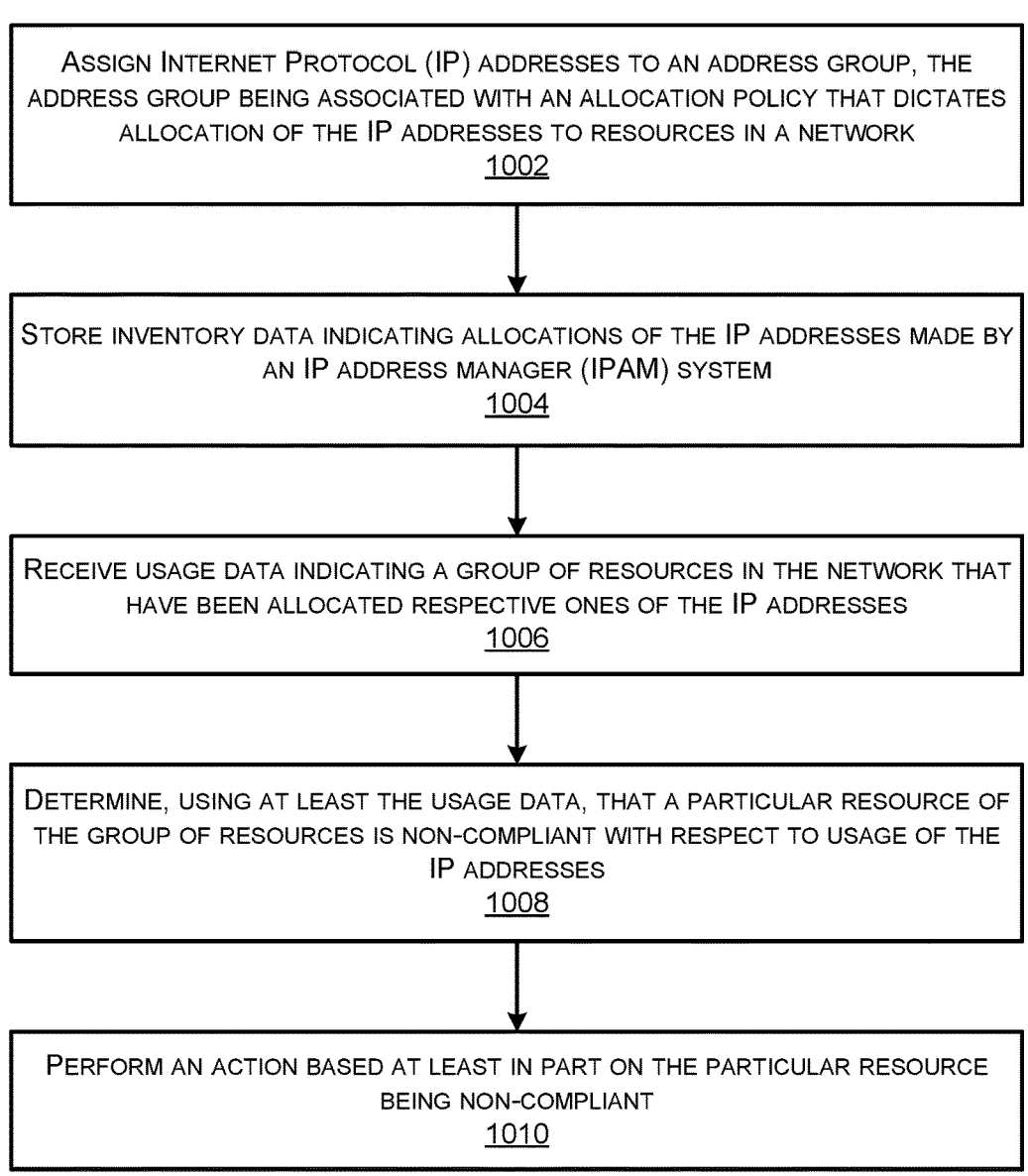
FIG. 10 illustrates a flow diagram of an example method for an IPAM system to determine that a resource is non-compliant with respect to IP address usage, and perform an action based on the resource being non-compliant.

FIG. 10 illustrates a flow diagram of an example method 1000 for an IPAM system 104 to determine that a resource is non-compliant with respect to IP address usage, and perform an action based on the resource being non-compliant.

At 1002, the IPAM system 104 may assign Internet Protocol (IP) addresses to an address group. In some instances, the address group (e.g., pool 110) is associated with an allocation policy 214 that dictates allocation of the IP addresses 118 to resources in a network.

At 1004, the IPAM system 104 may store inventory data indicating allocations of the IP addresses made by an IP address manager (IPAM) system. For instance, the IPAM system 104 may track in-band allocations of IP addresses 118 made to resources, releases of the allocations of IP addresses 118, and/or other changes made to IP address 118 allocations to resources in the network.

At 1006, the IPAM system 104 may receive usage data indicating a group of resources in the network that have been allocated respective ones of the IP addresses. The usage data may indicate allocations of IP addresses 118 may to resources, the release of IP addresses 118 from use by resources, in-band and/or out-of-band changes made with respect to resources and/or IP addresses 118 in regions 106, and so forth.

At 1008, the IPAM system 104 may determine, using at least the usage data, that a particular resource of the group of resources is non-compliant with respect to usage of the IP addresses. For instance, the IPAM system 104 may determine that the particular resource has an overlapping IP address 118 with another resource, is using an IP address 118 that was allocated by an OOB change, is using a CIDR block of IP addresses 118 that is larger than permitted by an allocation policy, and so forth.

At 1010, the IPAM system 104 may perform an action based at least in part on the particular resource being non-compliant. For instance, the IPAM system 104 may allocate a new IP address 118 to avoid the overlapping IP addresses 118, may backfill an unmanaged IP address 118, may alert an administrator 120 about the non-compliant resource and/or IP address 118, and so forth.

Figure 11:
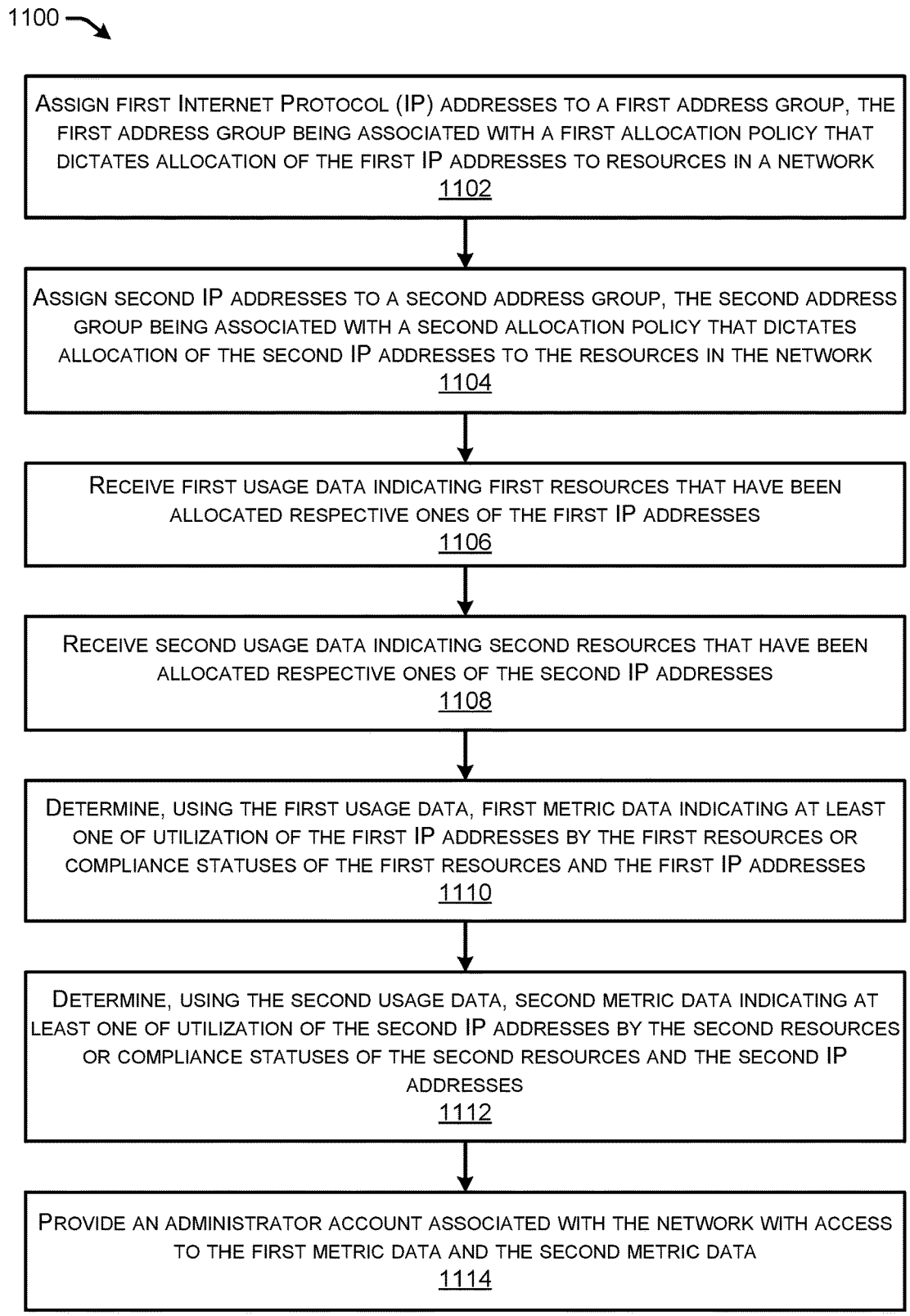
FIG. 11 illustrates a flow diagram of an example method for an IPAM system to monitor IP address usage across multiple address groups and provide metrics for the IP address utilization and/or compliance status to a network administrator.

FIG. 11 illustrates a flow diagram of an example method 1100 for an IPAM system to monitor IP address usage across multiple address groups and provide metrics for the IP address utilization and/or compliance status to a network administrator.

At 1102, the IPAM system 104 may assig first Internet Protocol (IP) addresses to a first address group, the first address group being associated with a first allocation policy that dictates allocation of the first IP addresses to resources in a network. For instance, a CIDR block of IP addresses 118 may be assigned to a pool 110 where the IP addresses 118 are allocated based on a first allocation policy 214.

At 1104, the IPAM system 104 may assign second IP addresses to a second address group, the second address group being associated with a second allocation policy that dictates allocation of the second IP addresses to the resources in the network. In some examples, the second IP addresses 118 may be included in a CIDR block of IP addresses 118 that may be assigned to a pool 110 where the IP addresses 118 are allocated based on a second allocation policy 214.

At 1106, the IPAM system 104 may receive first usage data indicating first resources that have been allocated respective ones of the first IP addresses. The first usage data may indicate resource data and IP address 118 assignment for the resources, and may additionally include in-band and/or out-of-band changes made with respect to IP address 118 usage for the first address group (e.g., first pool 110)

At 1108, the IPAM system 104 may receive second usage data indicating second resources that have been allocated respective ones of the second IP addresses. The second usage data may indicate resource data and IP address 118 assignment for the resources, and may additionally include in-band and/or out-of-band changes made with respect to IP address 118 usage for the second address group (e.g., second pool 110)

At 1110, the IPAM system 104 may determine, using the first usage data, first metric data indicating at least one of utilization of the first IP addresses by the first resources or compliance statuses of the first resources. For instance, the reconciliation component 126 and/or query component 128 may determine metrics 232 that indicate utilization of IP addresses 118 over periods of time, compliance and/or non-compliance of resources and/or IP addresses 118 with respect to IP address usage, and so forth.

At 1112, the IPAM system 104 may determine, using the second usage data, second metric data indicating at least one of utilization of the second IP addresses by the second resources or compliance statuses of the second resources. For instance, the reconciliation component 126 and/or query component 128 may determine metrics 232 that indicate utilization of IP addresses 118 over periods of time, compliance and/or non-compliance of resources and/or IP addresses 118 with respect to IP address usage, and so forth.

At 1114, the IPAM system 104 may provide an administrator account associated with the network with access to the first metric data and the second metric data. The first metric data 232 and second metric data 232 may generally comprise any data described herein that can be determined or monitored with respect to IP address 118 usage.

Figure 12:
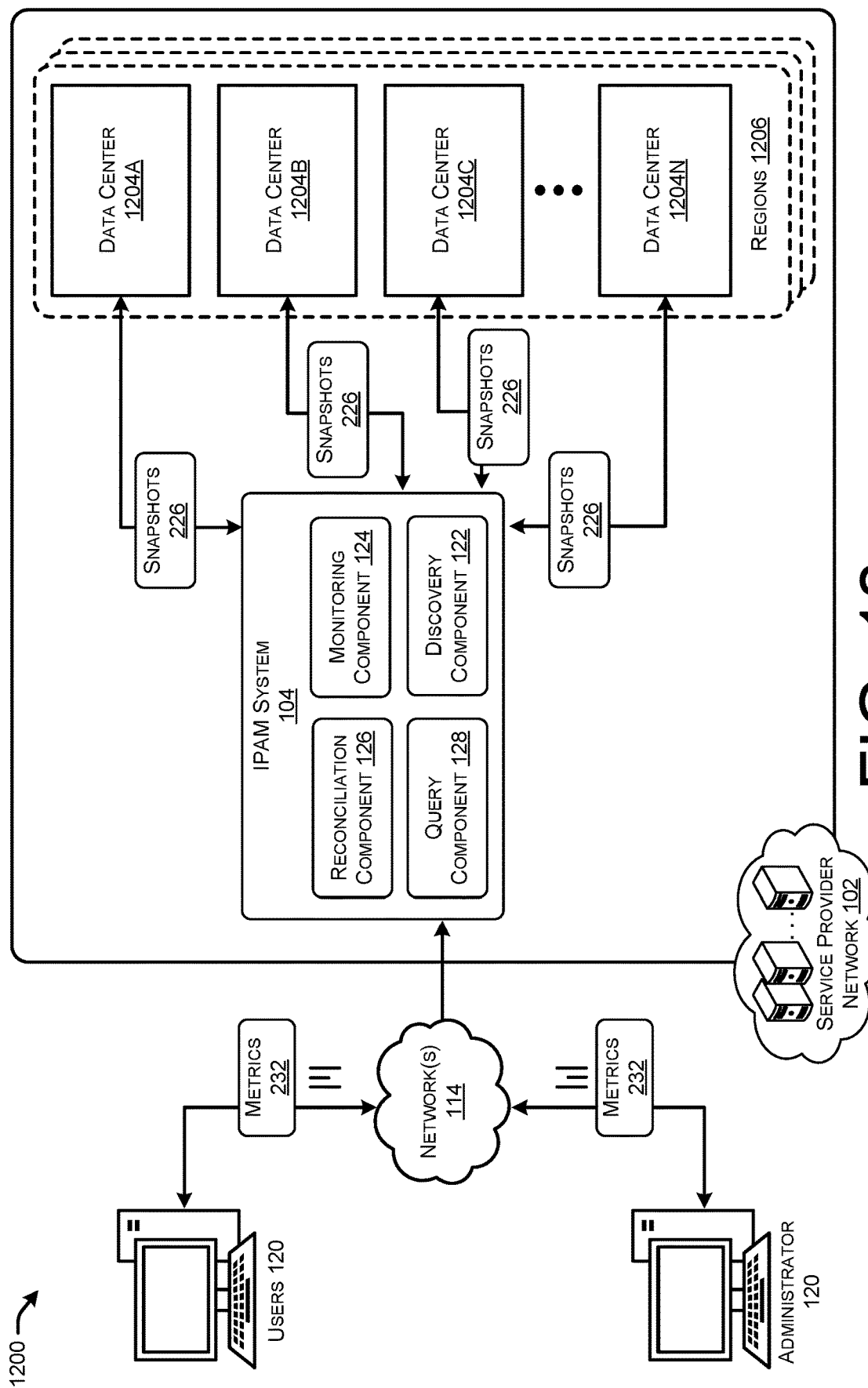
FIG. 12 is a system and network diagram that shows an illustrative operating environment that includes data centers of a service provider network that can be configured to implement aspects of the functionality described herein.

FIG. 12 is a system and network diagram 1200 that shows an illustrative operating environment that includes data centers 1204 in one or more regions 1206 of a service provider network 102 that can be configured to implement aspects of the functionality described herein. The service provider network 102 can provide computing resources, like VM instances and storage, on a permanent or an as-needed basis. Among other types of functionality, the computing resources provided by the service provider network 102 may be utilized to implement the various services described above. As also discussed above, the computing resources provided by the service provider network 102 can include various types of computing resources, such as data processing resources like VM instances, data storage resources, networking resources, data communication resources, network services, and the like.

Each type of computing resource provided by the service provider network 102 can be general-purpose or can be available in a number of specific configurations. For example, data processing resources can be available as physical computers or VM instances in a number of different configurations. The VM instances can be configured to execute applications, including web servers, application servers, media servers, database servers, gaming applications, some or all of the network services described above, and/or other types of programs. Data storage resources can include file storage devices, block storage devices, and the like. The service provider network 102 can also be configured to provide other types of computing resources not mentioned specifically herein.

The computing resources provided by the service provider network 102 may be enabled in one embodiment by one or more data centers 1204A-1204N (which might be referred to herein singularly as "a data center 1204" or in the plural as "the data centers 1204"). The data centers 1204 are facilities utilized to house and operate computer systems and associated components. The data centers 1204 typically include redundant and backup power, communications, cooling, and security systems. The data centers 1204 can also be located in geographically disparate locations, or regions 1208. One illustrative embodiment for a data center 1204 that can be utilized to implement the technologies disclosed herein will be described below with regard to FIG. 13.

The users 120 of the user devices that utilize the service provider network 102 may access the computing resources provided by the service provider network 102 over any wired and/or wireless network(s) 114, which can be a wide area communication network ("WAN"), such as the Internet, an intranet or an Internet service provider ("ISP") network or a combination of such networks. For example, and without limitation, a user device operated by a user 120 of the service provider network 102 may be utilized to access the service provider network 102 by way of the network(s) 114. It should be appreciated that a local-area network ("LAN"), the Internet, or any other networking topology known in the art that connects the data centers 1204 to remote clients and other users can be utilized. It should also be appreciated that combinations of such networks can also be utilized.

As shown, the data centers 1204 may be located in different regions 1206 (e.g., regions 106), and may have instances of the IPAM system 104 running in each region 1206. The instances of the IPAM system 104 may push snapshots 226, such as by storing the snapshots in local storage, for consumption by the IPAM system 104. The IPAM system 104 may then perform various techniques for managing and monitoring the usage of IP addresses 118 to maintain compliance of resources with respect to IP addresses.

Figure 13:
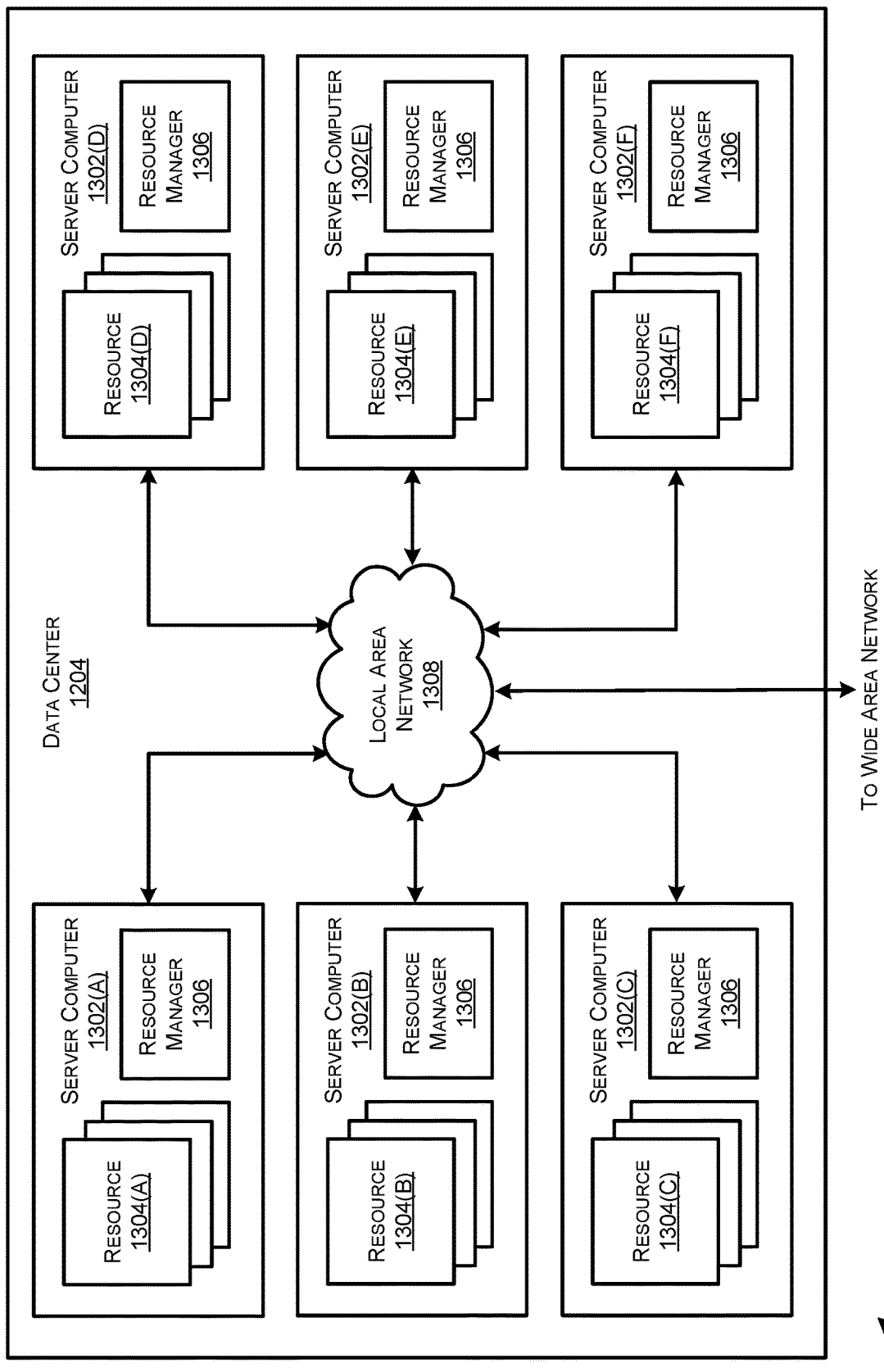
FIG. 13 is a computing system diagram illustrating a configuration for a data center that can be utilized to implement aspects of the technologies disclosed herein.

FIG. 13 is a computing system diagram 1300 that illustrates one configuration for a data center 1204 that implements aspects of the technologies disclosed herein. The example data center 1204 shown in FIG. 13 includes several server computers 1302A-1302F (which might be referred to herein singularly as "a server computer 1302" or in the plural as "the server computers 1302") for providing computing resources 1304A-1304E. In some examples, the resources 1304 and/or server computers 1302 may include, be included in, or correspond to, the computing devices described herein.

The server computers 1302 can be standard tower, rack-mount, or blade server computers configured appropriately for providing the computing resources described herein (illustrated in FIG. 13 as the computing resources 1304A-1304E). As mentioned above, the computing resources provided by the service provider network 102 can be data processing resources such as VM instances or hardware computing systems, database clusters, computing clusters, storage clusters, data storage resources, database resources, networking resources, and others. Some of the servers 1302 can also be configured to execute a resource manager 1306 capable of instantiating and/or managing the computing resources. In the case of VM instances, for example, the resource manager 1306 can be a hypervisor or another type of program configured to enable the execution of multiple VM instances on a single server computer 1302. Server computers 1302 in the data center 1204 can also be configured to provide network services and other types of services.

In the example data center 1204 shown in FIG. 13, an appropriate LAN 1308 is also utilized to interconnect the server computers 1302A-1302F. It should be appreciated that the configuration and network topology described herein has been greatly simplified and that many more computing systems, software components, networks, and networking devices can be utilized to interconnect the various computing systems disclosed herein and to provide the functionality described above. Appropriate load balancing devices or other types of network infrastructure components can also be utilized for balancing a load between each of the data centers 1204A-1204N, between each of the server computers 1302A-1302F in each data center 1204, and, potentially, between computing resources in each of the server computers 1302. It should be appreciated that the configuration of the data center 1204 described with reference to FIG. 13 is merely illustrative and that other implementations can be utilized.

Figure 14:
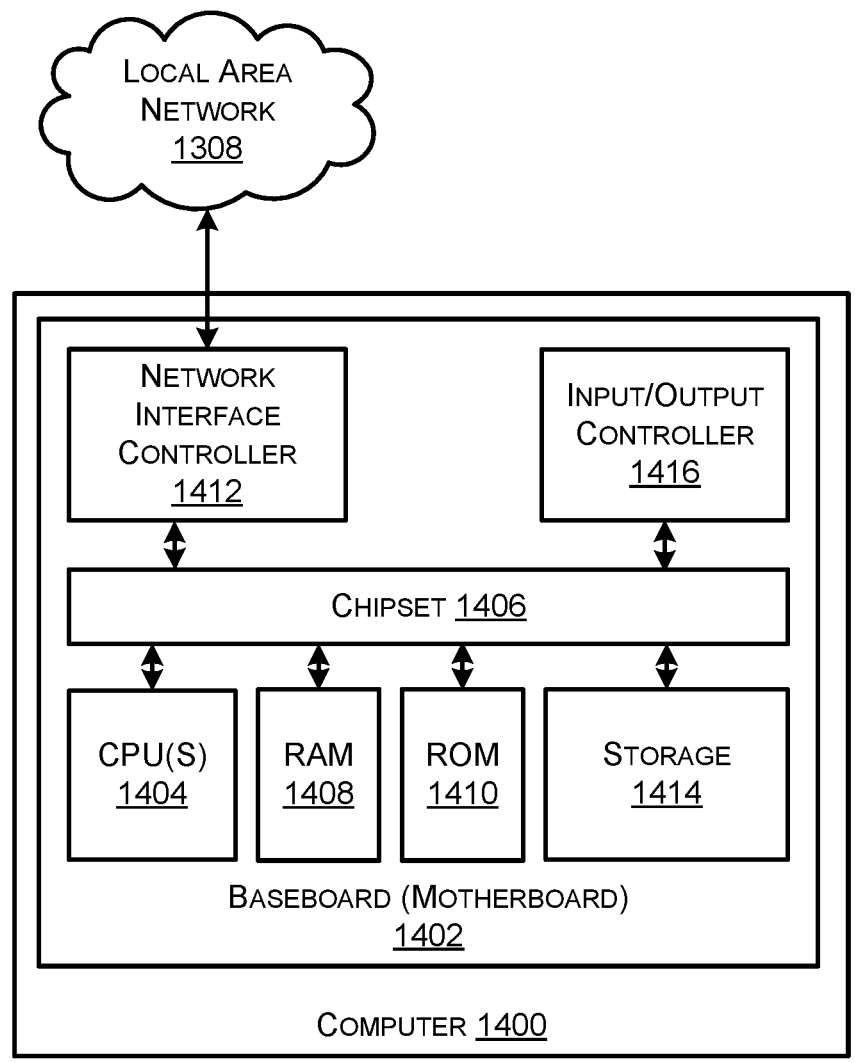
FIG. 14 is a computer architecture diagram showing an illustrative computer hardware architecture for implementing a computing device that can be utilized to implement aspects of the various technologies presented herein.

FIG. 14 shows an example computer architecture for a computer 1400 capable of executing program components for implementing the functionality described above. The computer architecture shown in FIG. 14 illustrates a conventional server computer, workstation, desktop computer, laptop, tablet, network appliance, e-reader, smartphone, or other computing device, and can be utilized to execute any of the software components presented herein.

The computer 1400 includes a baseboard 1402, or "motherboard," which is a printed circuit board to which a multitude of components or devices can be connected by way of a system bus or other electrical communication paths. In one illustrative configuration, one or more central processing units ("CPUs") 1404 operate in conjunction with a chipset 1406. The CPUs 1404 can be standard programmable processors that perform arithmetic and logical operations necessary for the operation of the computer 1400.

The CPUs 1404 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 1406 provides an interface between the CPUs 1404 and the remainder of the components and devices on the baseboard 1402. The chipset 1406 can provide an interface to a RAM 1408, used as the main memory in the computer 1400. The chipset 1406 can further provide an interface to a computer-readable storage medium such as a read-only memory ("ROM") 1410 or non-volatile RAM ("NVRAM") for storing basic routines that help to startup the computer 1400 and to transfer information between the various components and devices. The ROM 1410 or NVRAM can also store other software components necessary for the operation of the computer 1400 in accordance with the configurations described herein.

The computer 1400 can operate in a networked environment using logical connections to remote computing devices and computer systems through a network, such as the network 1108. The chipset 1406 can include functionality for providing network connectivity through a network interface controller (NIC) 1412, such as a gigabit Ethernet adapter. The NIC 1412 is capable of connecting the computer 1400 to other computing devices over the network 1108 (or 114). It should be appreciated that multiple NICs 1412 can be present in the computer 1400, connecting the computer to other types of networks and remote computer systems.

The computer 1400 can include storage 1414 (e.g., disk) that provides non-volatile storage for the computer. The storage 1414 can consist of one or more physical storage units. The storage 1414 can store information by altering the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 1400 can further read information from the storage 1414 by detecting the physical states or characteristics of one or more particular locations within the physical storage units.

In addition to the storage 1414 described above, the computer 1400 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer 1400. In some examples, the operations performed by the service provider network 102, and or any components included therein, may be supported by one or more devices similar to computer 1400. Stated otherwise, some or all of the operations performed by the service provider network 102, and or any components included therein, may be performed by one or more computer devices 1400 operating in a network-based arrangement.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

The storage 1414 can store an operating system utilized to control the operation of the computer 1400. According to one embodiment, the operating system comprises the LINUX operating system. According to another embodiment, the operating system comprises the WINDOWS SERVER operating system from MICROSOFT Corporation of Redmond, Wash. According to further embodiments, the operating system can comprise the UNIX operating system or one of its variants. It should be appreciated that other operating systems can also be utilized. The storage 1414 can store other system or application programs and data utilized by the computer 1400.

In one embodiment, the storage 1414, RAM 1408, ROM 1410, and/or other computer-readable storage media may be encoded with computer-executable instructions which, when loaded into the computer 1400, transform the computer from a general-purpose computing system into a special-purpose computer capable of implementing the embodiments described herein. These computer-executable instructions transform the computer 1400 by specifying how the CPUs 1404 transition between states, as described above. According to one embodiment, the computer 1400 has access to computer-readable storage media storing computer-executable instructions which, when executed by the computer 1400, perform the various techniques described above. The computer 1400 can also include computer-readable storage media having instructions stored thereupon for performing any of the other computer-implemented operations described herein.

The computer 1400 can also include one or more input/output controllers 1416 for receiving and processing input from a number of input devices, such as a keyboard, a mouse, a touchpad, a touch screen, an electronic stylus, or other type of input device. Similarly, an input/output controller 1416 can provide output to a display, such as a computer monitor, a flat-panel display, a digital projector, a printer, or other type of output device. It will be appreciated that the computer 1400 might not include all of the components shown in FIG. 14, can include other components that are not explicitly shown in FIG. 14, or might utilize an architecture completely different than that shown in FIG. 14.

In some examples, the service provider network 102 may be or comprise a cloud provider network. A cloud provider network (sometimes referred to simply as a "cloud") refers to a pool of network-accessible computing resources (such as compute, storage, and networking resources, applications, and services), which may be virtualized or bare-metal. The cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

A cloud provider network can be formed as a number of regions, where a region is a separate geographical area in which the cloud provider clusters data centers. Each region can include two or more availability zones connected to one another via a private high-speed network, for example a fiber communication connection. An availability zone (also known as an availability domain, or simply a "zone") refers to an isolated failure domain including one or more data center facilities with separate power, separate networking, and separate cooling from those in another availability zone. A data center refers to a physical building or enclosure that houses and provides power and cooling to servers of the cloud provider network. Preferably, availability zones within a region are positioned far enough away from one other that the same natural disaster should not take more than one availability zone offline at the same time. Customers can connect to availability zones of the cloud provider network via a publicly accessible network (e.g., the Internet, a cellular communication network) by way of a transit center (TC). TCs can be considered as the primary backbone locations linking customers to the cloud provider network, and may be collocated at other network provider facilities (e.g., Internet service providers, telecommunications providers) and securely connected (e.g. via a VPN or direct connection) to the availability zones. Each region can operate two or more TCs for redundancy. Regions are connected to a global network which includes private networking infrastructure (e.g., fiber connections controlled by the cloud provider) connecting each region to at least one other region. The cloud provider network may deliver content from points of presence outside of, but networked with, these regions by way of edge locations and regional edge cache servers. This compartmentalization and geographic distribution of computing hardware enables the cloud provider network to provide low-latency resource access to customers on a global scale with a high degree of fault tolerance and stability.

With cloud computing, instead of buying, owning, and maintaining their own data centers and servers, organizations can acquire technology such as compute power, storage, databases, and other services on an as-needed basis. The cloud provider network can provide on-demand, scalable computing services to users through a network, for example allowing users to have at their disposal scalable "virtual computing devices" via their use of the compute servers and block store servers. These virtual computing devices have attributes of a personal computing device including hardware (various types of processors, local memory, random access memory ("RAM"), hard-disk and/or solid state drive ("SSD") storage), a choice of operating systems, networking capabilities, and pre-loaded application software. Each virtual computing device may also virtualize its console input and output ("I/O") (e.g., keyboard, display, and mouse). This virtualization allows users to connect to their virtual computing device using a computer application such as a browser, application programming interface, software development kit, or the like, in order to configure and use their virtual computing device just as they would a personal computing device. Unlike personal computing devices, which possess a fixed quantity of hardware resources available to the user, the hardware associated with the virtual computing devices can be scaled up or down depending upon the resources the user requires. Users can choose to deploy their virtual computing systems to provide network-based services for their own use and/or for use by their customers or client.

The cloud provider network may implement various computing resources or services, which may include a virtual compute service, data processing service(s) (e.g., map reduce, data flow, and/or other large scale data processing techniques), data storage services (e.g., object storage services, block-based storage services, or data warehouse storage services) and/or any other type of network based services (which may include various other types of storage, processing, analysis, communication, event handling, visualization, and security services not illustrated). The resources required to support the operations of such services (e.g., compute and storage resources) may be provisioned in an account associated with the cloud provider, in contrast to resources requested by users of the cloud provider network, which may be provisioned in user accounts.

While the foregoing invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A method for an Internet Protocol (IP) address manager to monitor the usage of a plurality of IP addresses in a network of a service provider network, the method comprising:
   receiving, from an administrator account registered with the service provider network, a request for the IP address manager to manage usage of the plurality of IP addresses in the network;
   assigning first IP addresses to a first address group, the first address group being associated with a first allocation policy that defines first allocation rules for allocating the first IP addresses to first resources in a first geographic region;
allocating, by the IP address manager, the first IP addresses to the first resources according to the first allocation policy;
assigning second IP addresses to a second address group, the second address group being associated with a second allocation policy that defines second allocation rules for allocating the second IP addresses to second resources in a second geographic region;
allocating, by the IP address manager, the second IP addresses to the second resources according to the second allocation policy;
receiving, from the first geographic region, a first snapshot representing first usage states of the first IP addresses by the first resources;
receiving, from the second geographic region, a second snapshot representing second usage states of the second IP addresses by the second resources;
determining, based on the first usage states, that the first resources are compliant with the first allocation policy;
identifying a particular resource that was allocated an IP address in an out-of-band allocation by a service other than the IP address manager;
determining, based on the second usage states, that the allocation of the IP address to the particular resource of the second resources is non-compliant with respect to the second allocation policy;
determining an action to perform based on the particular resource being non-compliant with respect to the second allocation policy; and
performing the action.

2. The method of claim 1, wherein:
determining that the particular resource is non-compliant includes determining that the IP address is indicated as unallocated in an IP address inventory managed by the IP address manager; and
performing the action includes:
 determining that the particular resource having the IP address is permitted by the second allocation policy; and
 updating the IP address inventory to indicate that the IP address is allocated to the particular resource.

3. The method of claim 1, wherein:
determining that the particular resource is non-compliant includes determining that the IP address is no longer part of the network; and
performing the action includes updating an IP address inventory managed by the IP address managed to indicate that the IP address is unused in the network.

4. The method of claim 1, further comprising:
collecting, by a first instance of the IP address manager running in the first geographic region, first usage data indicating the first usage states; and
sending, from the first instance of the IP address manager, the first snapshot to a first storage location in the first geographic region based on a first timing schedule,
wherein receiving the first snapshot includes obtaining, by a second instance of the IP address manager running in the second geographic region, the first snapshot from the first storage location in the first geographic region based on a second timing schedule that is different than the first timing schedule.

5. A system comprising:
one or more processors; and
one or more computer-readable media storing computer-executable instructions that, when executed by the one or more processors, cause the one or more processors to perform operations comprising:
 assigning Internet Protocol (IP) addresses to an address group, the address group being associated with an allocation policy that dictates allocation of the IP addresses to resources in a network;
 storing inventory data indicating allocations of the IP addresses made by an IP address manager (IPAM) system;
 receiving usage data indicating a group of resources in the network that have been allocated respective ones of the IP addresses;
 determining, using at least the usage data, that a particular resource of the group of resources was allocated a particular IP address that is indicated in the inventory data as being unallocated;
 determining, using at least the usage data, that the allocation of the particular IP address to the particular resource is non-compliant with respect to the allocation policy; and
 performing an action based at least in part on the particular resource being non-compliant with respect to the allocation policy.

6. The system of claim 5, the operations further comprising:
determining that the particular resource having the particular IP address is permitted by the allocation policy,
wherein performing the action includes updating the inventory data to indicate that the particular IP address is allocated to the particular resource.

7. The system of claim 5, wherein determining that the allocation of the particular IP address to the particular resource is non-compliant includes:
determining a resource type of the particular resource; and
determining that the allocation policy restricts allocation of the IP addresses to resources that are of the resource type.

8. The system of claim 5, wherein determining that the allocation of the particular IP address to the particular resource is non-compliant includes determining that the particular resource was allocated a particular IP address that is also allocated to another resource in the network.

9. The system of claim 5, the operations further comprising:
identifying, from the usage data, an unmanaged IP address that was allocated by the IPAM system to a resource that is no longer part of the network,
wherein performing the action includes updating the inventory data to indicate that the IP address is available for allocation in the network.

10. The system of claim 5, wherein performing the action includes outputting, to an administrative account associated with the network, an alert indicating that the particular resource is non-compliant.

11. The system of claim 10, the operations further comprising:
determining a remedial action that brings the particular resource that is non-compliant back into compliance,
wherein the alert includes an indication of the remedial action.

12. The system of claim 5, the operations further comprising:
receiving, from a user account associated with the network, a request that the IPAM system manage the allocation of the IP addresses for the network; and determining that the particular IP address was allocated by in an out-of-band allocation by another system other than the IPAM system.

13. The system of claim 5, the operations further comprising:
receiving, from a user account associated with the network, rules that define how the IP addresses in the address group are to be allocated; and
generating the allocation policy based on the rules received from the user account.

14. A method comprising:
assigning Internet Protocol (IP) addresses to an address group, the address group being associated with an allocation policy that dictates allocation of the IP addresses to resources in a network;
receiving usage data indicating a group of resources in the network that have been allocated respective ones of the IP addresses by an IP address manager (IPAM) system;
identifying, using the usage data, a particular resource of the group of resources that was allocated a particular IP address by another system other than the IPAM system;
determining a resource type of the particular resource;
determining that the allocation policy disallows allocation of the particular IP address to the particular resource such that the allocation of the particular IP address to the particular resource by the other system is non-compliant with respect to the allocation policy; and
performing an action based at least in part on the allocation of the particular IP address to the particular resource being non-compliant with respect to the allocating policy.

15. The method of claim 14, further comprising determining, using the usage data, that another resource is non-compliant with respect to the allocation policy based at least in part on the other resource being allocated another IP address that is indicated in inventory data as being unallocated.

16. The method of claim 15, further comprising:
determining that the other resource having the other IP address is permitted by the allocation policy,
wherein performing the action includes updating inventory data to indicate that the other IP address is allocated to the other resource.

17. The method of claim 14, further comprising determining that another resource is non-compliant based at least in part on the other resource being allocated another IP address that is also allocated to a different resource in the network.

18. The method of claim 14, further comprising:
identifying, from the usage data, an unmanaged IP address that was allocated by the IPAM system to a resource that is no longer part of the network,
wherein performing the action includes updating inventory data to indicate that the IP address is available for allocation in the network.

19. The method of claim 14, wherein performing the action includes outputting, to an administrative account associated with the network, an alert indicating that the particular resource is non-compliant.

20. The method of claim 19, further comprising:
determining a remedial action that brings the particular resource that is non-compliant back into compliance,
wherein the alert includes an indication of the remedial action.

\* \* \* \* \*